(12) United States Patent
Feng et al.

(10) Patent No.: US 11,946,698 B1
(45) Date of Patent: Apr. 2, 2024

(54) METAL MELTING FURNACE INCLUDING A STIRRING DEVICE

(71) Applicant: ZHEJIANG HAILIANG CO., LTD., Zhejiang (CN)

(72) Inventors: Huanfeng Feng, Shaoxing (CN);
Gangfeng Sun, Shaoxing (CN);
Yunlong Wang, Shaoxing (CN)

(73) Assignee: ZHEJIANG HAILIANG CO., LTD., Shaoxing (CN)

( * ) Notice: Subject to any disclaimer, the term of this patent is extended or adjusted under 35 U.S.C. 154(b) by 0 days.

(21) Appl. No.: 18/242,253

(22) Filed: Sep. 5, 2023

(30) Foreign Application Priority Data

Aug. 17, 2023 (WO) ................ PCT/CN2023/113543

(51) Int. Cl.
*F27D 27/00* (2010.01)
*F27B 14/08* (2006.01)

(52) U.S. Cl.
CPC .............. *F27D 27/00* (2013.01); *F27B 14/08* (2013.01)

(58) Field of Classification Search
CPC .................................. F27D 27/00; F27B 14/08
USPC ................................................. 266/233, 235
See application file for complete search history.

(56) References Cited

U.S. PATENT DOCUMENTS

| | | | | |
|---|---|---|---|---|
| 4,191,559 A * | 3/1980 | Van Linden | ........ | C22B 21/0069 75/681 |
| 5,935,295 A * | 8/1999 | Megy | ...................... | C22C 1/026 420/590 |
| 6,060,013 A * | 5/2000 | Le Brun | .................... | C22B 9/05 266/233 |
| 6,375,712 B1 * | 4/2002 | Forberg | ................ | C22B 21/064 75/685 |
| 8,025,712 B2 * | 9/2011 | Dupuis | ................. | C22B 21/062 75/708 |

* cited by examiner

*Primary Examiner* — Jessee R Roe
*Assistant Examiner* — Michael Aboagye
(74) *Attorney, Agent, or Firm* — Oliff PLC

(57) ABSTRACT

A metal melting furnace including a stirring device as includes: a furnace body defining a chamber for accommodating molten metal; the stirring device including a stirring disc and a drive device, the stirring disc including a disc body, a feedstock holding portion, and a feedstock inlet via which feedstock is replenished to the feedstock holding portion, a stirring rod being connected on the disc body, a plurality of vertically through openings being provided on the disc body and/or on the feedstock holding portion, the drive device being in drive connection to the stirring rod, the drive device being configured to drive the stirring rod to lift such that the stirring disc is immersed in or lifted out of the molten metal in the chamber, the feedstock holding portion being configured to hold the feedstock on the stirring disc such that the feedstock move together with the stirring disc.

3 Claims, 17 Drawing Sheets

METAL MELTING FURNACE INCLUDING A STIRRING DEVICE

FIELD

The subject matter described herein relates to the field of metal smelting, and more particularly relates to a metal melting furnace including a stirring device.

BACKGROUND

Smelting involves a process of melting a primary metal charged into a melting furnace. During the melting process, components for conditioning the molten metal, such as feedstock and compounds, are added to the furnace to reduce impurities in the molten metal and remove those substances affecting quality of metal products.

Feedstock is generally added by being directly charged into the furnace. A feedstock with a density lower than that of the molten metal will float on top of the molten metal, while a feedstock with a density higher than that of the molten metal will sink to the bottom the molten metal. Since the molten metal in the melting furnace is in a stationary state, the melted feedstock likely concentrates on top or at bottom of the molten metal, and this inhomogeneous composition distribution would cause quality defects in the products. Therefore, after a feedstock is charged, it is needed to stir the molten metal such that composition of the feedstock is homogeneously distributed in the molten metal. However, during the stirring process, a vortex likely occurs and impurities deposited in the bottom layer are also likely diffused; therefore, the stirring should not be intense. At present, the stirring is generally done manually with an iron ladle. Due to the high-temperature work condition, high labor intensity, and easy occurrence of melt splashing, stirring is highly risky to operators. Manual stirring further has drawbacks such as inaccurate control of stirring intensity and insufficient stirring in some areas of the molten metal, finally affecting product quality.

SUMMARY

To overcome the above and other drawbacks of conventional technologies, embodiments of the disclosure provide a metal melting furnace including a stirring device, which replaces manual stirring with automatic stirring to realize homogeneous distribution of feedstock in molten metal, thereby mitigating labor intensity of operators and effectively controlling stirring duration and stirring range.

The disclosure adopts a technical solution below:

A metal melting furnace including a stirring device comprises:

- a furnace body defining a chamber for accommodating molten metal;
- the stirring device comprising a stirring disc and a drive device, the stirring disc comprising a disc body, a feedstock holding portion, and a feedstock inlet via which feedstock is replenished to the feedstock holding portion, a stirring rod being connected on the disc body, a plurality of vertically through openings being provided on the disc body and/or on the feedstock holding portion, the drive device being in drive connection to the stirring rod, the drive device being configured to drive the stirring rod to lift such that the stirring disc is immersed in or lifted out of the molten metal in the chamber, the feedstock holding portion being configured to hold the feedstock on the stirring disc such that the feedstock moves together with the stirring disc.

Based on the technical solution above, the feedstock holding portion comprises a cavity configured to accommodate the feedstock, the feedstock inlet communicating with the cavity, the openings comprising a first opening provided at a top wall of the cavity and a second opening provided at a bottom wall of the cavity, the first opening and the second opening having a size smaller than that of the feedstock.

Based on the technical solution above, a height of the bottom wall of the cavity is gradually reduced from the feedstock inlet towards the first opening, and the feedstock charged in the cavity via the feedstock inlet moves till below the first opening along the bottom wall of the cavity.

Based on the technical solution above, the feedstock holding portion further comprises a baffle plate, the baffle plate being formed as extending from the top wall of the cavity between the feedstock inlet and the first opening towards the bottom wall of the cavity, two sides of the baffle plate being connected to sidewalls of the cavity.

Based on the technical solution above, the baffle plate tilts from top to bottom towards the feedstock inlet.

Based on the technical solution above, the stirring disc further comprises an annular boss disposed at a bottom portion of the disc body, an outer-ring wall of the annular boss being connected to a periphery of the disc body, a lower end of the annular boss being tapered from top to bottom.

Based on the technical solution above, the openings further comprise a third opening, the third opening being disposed at a portion of the disc body corresponding to a circular space enclosed by the annular boss.

Based on the technical solution above, the circular space is flared from top to bottom.

Based on the technical solution above, a height of an upper surface of the disc body is gradually reduced from the stirring rod to the periphery of the disc body.

Based on the technical solution above, the metal melting furnace further comprises an automatic charger configured to replenish the feedstock to the feedstock holding portion.

Based on the technical solution above, the automatic charger comprises an outlet path, a feedstock reservoir communicating with the outlet path, and a pusher, the pusher being configured to push the feedstock on the outlet path such that the feedstock falls onto the feedstock holding portion.

Based on the technical solution above, the pusher comprises a base, two pushing arms rotatably mounted on the base, and a pushing ram configured to push the base, and the automatic charger further comprises a slide groove which communicates with the outlet path such that the pusher enters/exits the outlet path, the feedstock reservoir being disposed above the outlet path, the feedstock reservoir communicating with the outlet path via a feed path.

Based on the technical solution above, the two pushing arms are folded to push the feedstock, and the two pushing arms, when being folded, enclose an avoidance hole, the feedstock in the feed path passing through the avoidance hole to enter the outlet path; when the pusher moves backward, the two push arms are deployed so as to be separated from the feedstock in the avoidance hole.

Based on the technical solution above, upon pushing the feedstock, an end portion of the pushing ram extends out from the base till between the two pushing arms to stop rotation of the pushing arms; when the pusher moves backward, the end portion of the pushing ram is retracted in the base; after the feedstock pushes the two pushing arms to be deployed, the pusher is separated from the feedstock; an avoidance groove for avoiding the pushing arms is provided at a sidewall of the outlet path, a sidewall of the slide groove being provided with a guide groove connected to the avoidance groove; and in a backward movement direction of the pusher; the guide groove is shrunk to push the two pushing arms to be folded.

A metal melt furnace including a stirring device comprises:

a furnace body defining a chamber for accommodating molten metal;

the stirring device comprising a stirring rod and a drive device, a feedstock holding portion and an impeller being provided outwardly along a radial direction on an outer sidewall of the stirring rod, the drive device being in drive connection to the stirring rod so as to drive the stirring rod to rotate and lift such that the feedstock holding portion and the impeller, when being immersed in the molten metal, rotate to stir the molten metal, feedstock being held on the feedstock holding portion such that the feedstock moves along with the feedstock holding portion.

Based on the technical solution above, the feedstock holding portion comprises a housing, a cavity defined by the housing, and a through hole which is provided on the housing and communicates with the cavity, the through hole having a size smaller than that of the feedstock.

Based on the technical solution above, the cavity comprises an inlet zone and a melting zone; a feedstock inlet communicating with the cavity so as to charge the feedstock to the inlet zone is further provided on the housing; a feedstock guide portion for guiding the feedstock from the inlet zone to the melting zone is provided at a bottom wall of the cavity.

Based on the technical solution above, in a rotating direction of the stirring rod, a front end of the impeller is higher than a rear end thereof so as to guide the molten metal to flow from top to bottom during rotating of the impeller.

Based on the technical solution above, the impeller is disposed below the feedstock holding portion so as to guide the molten metal carrying feedstock composition to move downward during stirring.

The disclosure offers the following benefits:

A metal furnace including a stirring device according to the disclosure is provided with a stirring disc. During the smelting process, the feedstock charged into the molten metal can be held on the stirring disc via the feedstock holding portion, such that the feedstock, together with the stirring disc, may be immersed into the molten metal, without floating on top of the molten metal, which prevents oxidization reaction and abnormal loss of the feedstock due to being exposed to the air in a high-temperature environment; in addition, this design can also increase oxygen content in the molten metal; al the feedstock does not float on top of the molten metal or sink to the bottom of the molten metal, preventing inhomogeneous composition distribution of the molten metal. Driven by the drive device, the stirring disc may move up and down in the molten metal, which enhances homogeneity of the feedstock in the molten metal, thereby ensuring consistent quality of metal products; in addition, this design eliminates a need of manual stirring, reduces labor intensity of operators, and lowers risks. Moreover, automated stirring offers a larger stirring range than manual stirring and avoids the quality issue arising from insufficient stirring in some areas of the molten metal, which also gives a higher stirring efficiency than manual operation and reduces the duration of stirring operation.

The vertically through openings allow for the molten metal to pass through the stirring disc, which reduces the resistance subjected to the stirring disc when moving up and down in the molten metal and avoids extensive diffusion of bottom-layer impurities caused by the induced vortex of the molten metal, such that the molten metal may flow gently during up-and-down movement of the stirring disc. Generally, extensive impurities would be deposited at the bottom layer of molten metal; the molten metal at the bottom layer does not participate in the casting process, but always resides in the melting furnace till the furnace is scrapped. In the disclosure, since the stirring disc does not induce extensive diffusion of the impurities during the feedstock melting process, the quality of the molten metal available for casting in the chamber will not be affected; in addition, it takes less time for letting the stirred molten metal stand till the impurities settle, without incurring unnecessary energy waste; and meanwhile the disclosure may enhance smelting efficiency of the molten metal and thus improve productivity.

Furthermore, the feedstock holding portion comprises a cavity for accommodating the feedstock, the feedstock inlet communicates with the cavity, and the openings comprise a first opening provided in the top wall of the cavity and a second opening provided in the bottom wall of the cavity, the first opening and the second opening having a size smaller than that of the feedstock. The feedstock is accommodated in the cavity, during the stirring process, the molten metal may access the cavity via the first opening and the second opening, where it is sufficiently mixed with the feedstock. Then, the molten metal mixed with the feedstock composition flows out of the cavity via the first opening and the second opening to be mixed with external molten metal, whereby the feedstock is sufficiently distributed in the molten metal. Since the sizes of the first opening and the second opening are smaller than that of the feedstock, the feedstock can be kept in the chamber; with the feedstock being melt, its size will be shrunk to be smaller than that of the first opening and the second opening, such that it likely escapes from the stirring disc via the first opening and the second opening; however, since the shrunk size of the feedstock is very small, even if it floats on top of the molten melt or sinks to the bottom of the molten melt, it has little impact on the composition of molten metal; in addition, if the molten metal has a higher melting point, the feedstock will be completely melted before floating on top of the molten metal or sinking to the bottom of the molten metal.

Furthermore, the bottom wall of the cavity has a height gradually reduced from the feedstock inlet towards the direction of the first opening. The feedstock charged into the cavity via the feedstock inlet may move till beneath the first opening along the bottom wall of the cavity. The feedstock entering the cavity via the feedstock inlet may move along the bottom wall under the guide of the bottom wall, thereby falling below the first opening. If the feedstock has a density greater than the molten metal, the feedstock can be kept at the bottom wall of the cavity without exiting the stirring disc via the feedstock inlet during up-and-down movement of the stirring disc; if the feedstock has a density smaller than that of the molten metal, the feedstock will float up to abut against the top wall of the cavity after the stirring disc is immersed in the molten metal, in which case since the floating feedstock is located beneath the first opening, it does not easily escape from the stirring disc via the feedstock inlet.

Furthermore, the feedstock holding portion further comprises a baffle plate, the baffle plate being formed as extending from the cavity between the feedstock inlet and the first opening towards the bottom wall of the cavity, both sides of the baffle plate being connected to sidewalls of the cavity. In a case that the density of the feedstock is lower than that of the molten metal, the feedstock will move upward after the stirring, disc is immersed in the molten metal; the baffle plate serves to baffle the upward floating feedstock and limit the feedstock from moving towards the feedstock inlet. The feedstock before floating upward is located in the cavity offset from the feedstock inlet; since the surface of the molten metal flows gently, the feedstock's upward floating follows a substantially vertically linear path, such that it does not easily move towards the direction of the feedstock inlet during the upward floating process; even if the upward floating feedstock has a tendency of moving towards the feedstock inlet, it will be baffled and stopped by the lower end of the baffle plate after floating upward a certain height, thereby avoiding the circumstance that the feedstock is separated from the stirring disc during the process of immersing the stirring disc in the molten metal. In addition, since both sides of the baffle plate are connected to the sidewall of the cavity, the feedstock cannot bypass the baffle plate to move towards the feedstock inlet.

Furthermore, the baffle plate tilts from top to bottom towards the direction of the feedstock inlet; the tilting design of the baffle plate improves the feedstock baffling range of the lower end of the baffle plate, which may thus improve reliability.

Furthermore, the stirring disc further comprises an annular boss disposed at a bottom portion of the disc body, an outer-ring wall of the annular boss being connected to a periphery of the disc body, the lower end of the annular boss being tapered from top to bottom. The annular boss protrudes from the bottom portion of the disc body, such that during the process of immersing the stirring disc in the molten metal, the annular boss first accesses the molten metal prior to the disc body; since the lower end of the annular boss is tapered, the annular boss, during the process of being immersed in the molten metal, generates a reduced intensity in stirring the molten metal, without incurring an intensive fluctuation in the molten metal. The outer-ring wall of the annular boss is connected to the periphery of the disc body, such that the periphery of the disc body does not protrude from the annular boss, which reduces the molten metal stirring magnitude at its peripheral portion during the process of immersing the disc body in the molten metal, avoiding formation of a vortex around the stirring disc.

Furthermore, the openings further comprise a third opening, the third opening being disposed at a portion of the disc body corresponding to a circular space enclosed by the annular boss. When the annular boss is completely immersed into the molten metal, a lower surface, corresponding to the circular space, on the disc body will be exposed to the molten metal; provision of the third opening allows for the gas in the circular space to be discharged via the third opening during the downward-moving process of the stirring disc and also allows for the molten metal to pass through the third opening, thereby reducing the molten metal stirring magnitude of the stirring disc. In addition, provision of the circular space can also reduce the overall weight of the stirring disc, thereby reducing the load of the drive device.

Furthermore, the circular space is flared from top to bottom. The sidewall of the circular space serves to guide the molten metal, which can reduce the molten metal stirring magnitude of the top wall of the circular space.

Furthermore, a height of an upper surface of the disc body is gradually reduced from the stirring rod to the periphery of the disc body. The upper surface of the disc body serves to guide the molten metal such that when the stirring disc moves upward, the molten metal above the stirring disc may be guided by the upper surface of the disc body to flow towards the periphery of the disc body, which can reduce the magnitude of stirring the molten metal, and during the process of the stirring disc exiting the molten metal, the molten metal left on the upper surface of the stirring disc may be reduced so as to prevent the cooled molten metal from blocking the openings.

Furthermore, the metal melting furnace further comprises an automatic charger configured to replenish the feedstock to the feedstock holding portion. The automatic charger allows for automatic replenishment of feedstock to the stirring disc, which eliminates manual charging, thereby enhancing operation safety as well as operation efficiency.

Furthermore, the automatic charger comprises an outlet path, a feedstock reservoir communicating with the outlet path, and a pusher, the pusher being configured to push the feedstock on the outlet path such that the feedstock falls onto the feedstock holding portion. The feedstock reservoir communicates with the outlet path, such that the feedstock in the feedstock reservoir can access the outlet path; the pusher may push the feedstock in the outlet path such that the feedstock is pushed out of the outlet path and falls on the feedstock holding portion, thereby realizing automatic replenishment of the feedstock.

Furthermore, the pusher comprises a base, two pushing arms rotatably mounted on the base, and a pushing ram configured to push the base, and the automatic charger further comprises a slide groove which communicates with the outlet path such that the pusher enters/exits the outlet path, the feedstock reservoir being disposed above the outlet path, the feedstock reservoir communicating with the outlet path via a feed path. The pushing ram may push the base to drive the pushing arms to move; the pushing arms may extend out of the slide groove along with the base to access the outlet path; during the pushing process, the pushing arms can push the feedstock in the outlet path such that the feedstock moves forward and falls onto the feedstock holding portion from the outlet path, and the feedstock in the feedstock reservoir can access the outlet path along the outlet path, whereby replenishment of the feedstock in the outlet path is completed.

Furthermore, the two pushing arms are folded to push the feedstock, and the two pushing arms, when being folded, enclose an avoidance hole, the feedstock in the feed path passing through the avoidance hole to enter the outlet path; when the pusher moves backward, the two push arms are deployed so as to be separated from the feedstock in the avoidance hole. During the pushing process, the pushing arms are kept folded so as to push the feedstock in the outlet path; since the two folded pushing arms can enclose an avoidance hole, the feedstock in the feed path can pass through the avoidance hole and then enters the outlet path, whereby replenishment of the feedstock in the outlet path is completed; during return movement of the pusher, the two pushing arms are deployed to be separated from the feedstock, such that the pushing arms may be retracted into the slide groove.

Furthermore, upon pushing the feedstock, an end portion of the pushing ram extends out from the base till between the two pushing arms to stop rotation of the pushing arms; when the pusher moves backward, the end portion of the pushing ram is retracted in the base; after the feedstock pushes the two pushing arms to be deployed, the pusher is separated from the feedstock; an avoidance groove for avoiding the pushing arms is provided at a sidewall of the outlet path, a sidewall of the slide groove being provided with a guide groove connected to the avoidance groove; and in a backward movement direction of the pusher, the guide groove is shrunk to push the two pushing arms to be folded. The end portion of the pushing ram may extend out of the base during the pushing process. The end portion of the pushing ram is disposed between the two pushing arms so as to be capable of stopping the two pushing arms, whereby rotation of the two pushing arms is limited such that the two pushing arms can be kept in a folded state so as to push the feedstock to move. Upon return movement, since the end portion of the pushing ram has been retracted in the base, rotation of the two pushing arms is not limited, while the feedstock cannot access the slide groove; therefore, during return movement of the pusher, a mutually compressive force occurs between the pushing arms and the feedstock, where the compressive force causes the two pushing arms to be separated and deployed, thereby being separated from the feedstock. The avoidance groove may provide a space for deployment of the pushing arms. The guide groove is connected to the avoidance groove, such that the deployed pushing arms may enter the guide groove from the avoidance groove. As the base moves, the pushing arms will access the inner wall of the guide groove and be gradually pushed by the inner wall of the guide groove, such that the two pushing arms move close to each other to be refolded.

Embodiments of the disclosure provide a further metal melting furnace including a stirring device. During the smelting process, the feedstock charged in the molten metal may be held on the feedstock holding portion, such that the feedstock may be immersed into the molten metal along with the feedstock holding portion without floating on top of the molten metal, which prevents the feedstock from being exposed to the air in the high-temperature environment and oxidized to cause abnormal loss of the feedstock; in addition, the oxygen content in the molten metal may also increase; the feedstock does not flow on top of the molten metal or sink to the bottom of the molten metal, without causing inhomogeneous distribution of the composition of the molten metal. Driven by the drive device, the stirring rod may drive the impeller and the feedstock holding portion to rotate to stir the molten metal, which may improve homogeneity of the feedstock in the molten metal to ensure consistent quality of the metal products; in addition, it eliminates a need for manual stirring, which reduces labor intensity of operators and lowers risks. Moreover, the automatic stirring offers a larger stirring range than manual stirring, preventing quality defects due to insufficient stirring of some areas in the molten metal; in addition, its stirring efficiency is also higher than the manual operation with reduced stirring duration.

Furthermore, the feedstock holding portion comprises a housing, a cavity defined by the housing, and a through hole which is provided on the housing and communicates with the cavity, the through hole having a size smaller than that of the feedstock. The feedstock is accommodated in the cavity; during the stirring process, the molten metal may access the cavity via the through hole so as be sufficiently mixed with the feedstock; then, the molten metal mixed with the feedstock composition flows out of the cavity via the through hole so as to be mixed with the external molten metal; in this way, the feedstock is homogeneously distributed in the molten metal. Since the size of the through hole is smaller than that of the feedstock, the feedstock can be kept in the cavity. As the feedstock is melted, its size will be shrunk to be smaller than that of the through hole, such that the feedstock likely exits the feedstock holding portion via the through hole; however, since the feedstock has been significantly shrunk, even if it floats on top of the molten metal or sinks to the bottom of the molten metal, there would have little impact on the composition of the molten metal; and if the molten metal has a high melting point, the feedstock would be completely melted before floating on top of the molten metal or sinking to bottom of the molten metal.

Furthermore, the cavity comprises an inlet zone and a melting zone; a feedstock inlet communicating with the cavity so as to charge the feedstock to the inlet zone is further provided on the housing; a feedstock guide portion for guiding the feedstock from the inlet zone to the melting zone is provided at a bottom wall of the cavity. The feedstock inlet communicates with the cavity so as to replenish the feedstock to the feedstock holding portion after the feedstock is used up, the feedstock entering the inlet zone via the feedstock inlet; the feedstock is immersed into the it melting zone from the inlet zone under the guide by the feedstock guide portion, thereby reducing the odds of the feedstock exiting the feedstock holding portion via the feedstock inlet.

Furthermore, in a rotating direction of the stirring rod, a front end of the impeller is higher than a rear end thereof so as to guide the molten metal to flow from top to bottom during rotating of the impeller. During the stirring process, the impeller can guide the molten metal to flow from top to bottom; in this way, the molten metal in the bottom layer will not be brought to move upward, without causing diffusion of the impurities in the bottom layer of the molten metal and deteriorating product quality.

Furthermore, the impeller is disposed below the feedstock holding portion so as to guide the molten metal carrying feedstock composition to move downward during stirring. The feedstock holding portion is disposed above the impeller; the molten feedstock is distributed in the top-layer molten metal; while the impeller can guide the molten metal downward; thus, the impeller can guide the top-layer molten metal including extensive feedstock composition to move downward, thereby homogenizing feedstock distribution.

The above and other features and benefits of the disclosure will be described in more detail through example embodiments with reference to the accompanying drawings.

BRIEF DESCRIPTION OF THE DRAWINGS

Hereinafter, the disclosure will be described in further detail with reference to the accompanying drawings.

Figure 1:
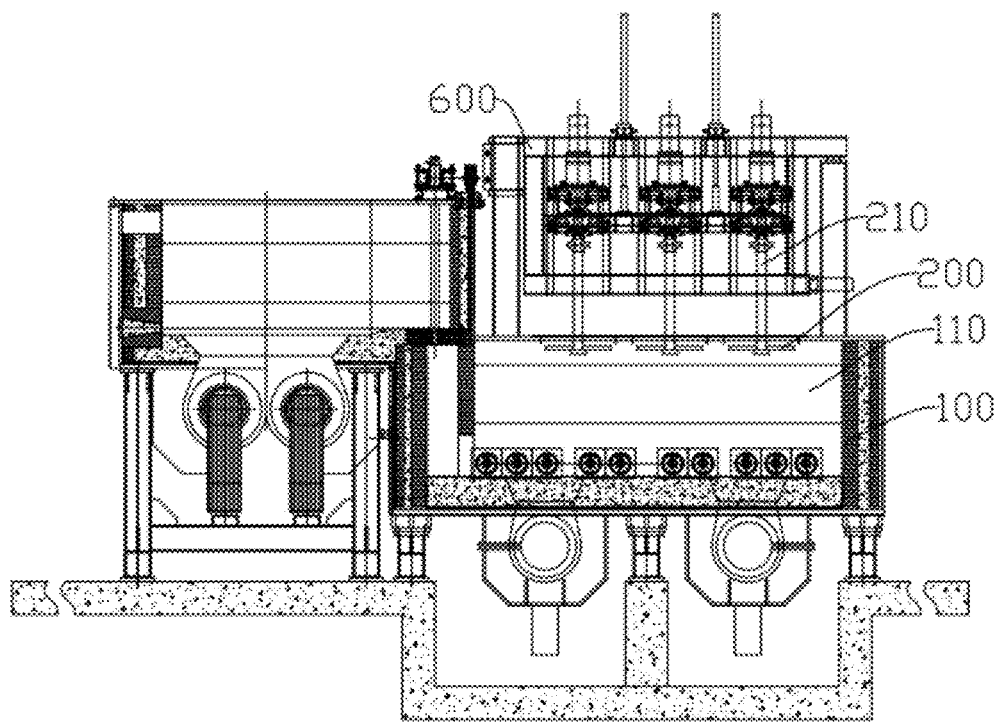
FIG. 1 is a structural schematic diagram of a metal melting furnace including a stirring device when a stirring disc moves downward in some embodiments of the disclosure.

REFERENCE NUMERALS furnace body 100, chamber 110;
stirring disc 200, feedstock inlet 201, stirring rod 210, disc body 220, annular boss 230, drainage port 240, outer-ring wall 250, third opening 260, circular space 270, inner-ring wall 280, radial opening 290;
drive device 300, lifting power element 310, rotating power element 320, splined sleeve 330;
feedstock holding portion 400, cavity 410, inlet zone 411, melting zone 412, first opening 420, second opening 430, baffle plate 440, impeller 450, housing 460, through hole 470;
automatic charger 500, outlet path 510, rising segment 511, descending segment 512, protrusion portion 513, feedstock reservoir 520, pusher 530, base 531, pushing arm 532, pushing ram 533, slide groove 534, avoidance hole 535, limiting groove 536, limiting protrusion 537, feed path 540, avoidance groove 550, guide groove 560, hopper 570; inlet opening 571; outlet opening 572; buffer bin 580; buffer channel 581; forward tilting segment 5811, backward tilting segment 5812, feed port 5813, storage channel 582, through bore 583, pushing mechanism 590, drive 591, first drive 5911, second drive 5912, pushing element 592, first pushing element 5921, second pushing element 5922;
rotating chassis 600;
inlet path 700, feedstock replenishing port 710, feedstock guide chute 720.

DETAILED DESCRIPTION

Hereinafter, the technical solutions of the disclosure will be explained and described through example embodiments with reference to the accompanying drawings. It is noted that the example embodiments described infra are only preferred examples, not the entirety of the embodiments of the disclosure. All other embodiments derived by those skilled in the art based on the example embodiments without exercise of inventive efforts shall fall within the scope of protection of the disclosure.

The terms "exemplary" and "some example embodiments" appearing infra mean "used as an example, an example implementation, or an illustration," and any embodiment described in an "exemplary" way is not necessarily interpreted as preferred over or better than other example implementations. To better illustrate the disclosure, various details are provided in the example embodiments below, and those skilled in the art shall appreciate that the disclosure can also be implemented without some details thereof.

Referring to FIGS. 1 to 10, embodiments of the disclosure provide a metal melting furnace including a stirring device, comprising: a furnace body 100 and the stirring device, the furnace body 100 defining a chamber 110 for accommodating molten metal, the stirring device being configured to sufficiently mix feedstock charged into the chamber 110 with the molten metal such that the feedstock is homogeneously distributed in the molten metal. The stirring device comprises a stirring disc 200, a stirring rod 210 connected to the stirring disc 200, and a drive device 300 in drive connection to the stirring rod 210, the stirring disc 200 having a feedstock holding portion 400, the drive device 300 being configurable to drive the stirring rod 210 to move up and down such that the stirring disc 200 is immersed in or lifted out of the molten metal in the chamber 110, a plurality of vertically through opening being provided on the stirring disc 200 such that during the stirring process, the feedstock in the feedstock holding portion 400, along with the stirring disc 200, is immersed in the molten metal in which the feedstock is melted, the drive device 300 being configured to drive the stirring rod 210 to lift reciprocally.

During the smelting process of the metal melting furnace including a stirring device, the feedstock charged into the molten metal can be held on the stirring disc 200 via the feedstock holding portion 400, such that the feedstock, along with the stirring disc 200, may be immersed into the molten metal, without floating on top of the molten metal, which prevents oxidization reaction and abnormal loss of the feedstock due to being exposed to the air in a high-temperature environment; in addition, this design can also increase oxygen content in the molten metal, and prevents inhomogeneous composition distribution of the molten metal due to floating of the feedstock on top of the molten metal or sinking of the feedstock to the bottom of the molten metal. The stirring rod 210 is configurable to lift reciprocally under the action of the drive device 300, such that the stirring disc 200 moves up and down in the molten metal, which may enhance homogeneity of the feedstock in the molten metal, thereby ensuring consistent quality of metal products; in addition, this design eliminates a need of manual stirring, reduces labor intensity of operators, and lowers risks. Moreover, automated stirring offers a larger stirring range than manual stirring and avoids the quality issue arising from insufficient stirring in some areas of the molten metal, which also gives a higher stirring efficiency than manual operation and reduces the duration of stirring operation.

The vertically through openings allow for the molten metal to pass through the stirring disc 200, which reduces the resistance subjected to the stirring disc 200 when moving up and down in the molten metal and avoids extensive diffusion of bottom-layer impurities caused by the induced vortex of the molten metal, such that the molten metal may flow gently during up-and-down movement of the stirring disc 200. Generally, extensive impurities would be deposited at the bottom layer of molten metal; the molten metal at the bottom layer does not participate in the casting process, but always resides in the melting furnace till the furnace is scrapped. In the disclosure, since the stirring disc 200 does not induce extensive diffusion of the impurities during the feedstock melting process, the quality of the molten metal available for casting in the chamber 110 will not be affected; in addition, it takes less time for letting the stirred molten metal stand till the impurities settle, without incurring unnecessary energy waste (i.e., the energy consumed for holding the molten state of the metal during the standing duration); and meanwhile, the disclosure may enhance smelting efficiency of the molten metal and thus improve productivity.

In the disclosure, the molten metal refers to molten copper, and the feedstock refers to zinc; alternatively, the feedstock may be other elements or compounds, and the molten metal may also be molten iron, molten steel, etc.

Since the molten metal is rapidly cooled down when being exposed to the air, it is improper to design a movable part on the stirring disc 200 to hold the feedstock; in addition, after the feedstock size is shrunk, it becomes unholdable. Referring to FIGS. 4 to 10, based on the example embodiment described supra, in one implementation of the disclosure, the feedstock holding portion 400 defines a cavity 410 for accommodating the feedstock, and the openings comprise a first opening 420 provided in the top wall of the cavity 410 and a second opening 430 provided in the bottom wall of the cavity 410, the first opening 420 and the second opening 430 having a size smaller than that of the feedstock; during the stirring process, the molten metal may access the cavity 410 via the first opening 420 and the second opening 430, where it is sufficiently mixed with the feedstock. Then, the molten metal mixed with the feedstock composition flows out of the cavity 410 via the first opening 420 and the second opening 430 to be mixed with external molten metal, whereby the feedstock is sufficiently distributed in the molten metal.

Since the sizes of the first opening 420 and the second opening 430 are smaller than that of the feedstock, the feedstock can be kept in the cavity 410; with the feedstock being melt, its size is shrunk to be smaller than that of the first opening 420 and the second opening 430, such that it likely escapes from the stirring disc 200 via the first opening 420 and the second opening 430; however, since the shrunk size of the feedstock is very small, even if they float on top of the molten melt or sink to the bottom of the molten melt, it has little impact on the composition of molten metal; in addition, if the molten metal has a higher melting point, the feedstock will be completely melted before floating on top of the molten metal or sinking to the bottom of the molten metal.

In addition, a feedstock inlet 201 in communication with the cavity 410 is provided on an upper surface of the stirring disc 200, where the feedstock may be replenished into the cavity 410 via the feedstock inlet 201. The size of the feedstock inlet 201 is slightly greater than that of the feedstock. In an example implementation, a ratio of the size of the feedstock inlet 201 to the size of the feedstock ranges from 11/10 to 6/5. With this design, it becomes more difficult for the feedstock to leave the cavity 410 via the feedstock inlet 201.

Furthermore, the bottom wall of the cavity 410 has a height gradually reduced from the feedstock inlet 201 towards the direction of the first opening 420. In the disclosure, the feedstock is a spherical object, which, after being charged into the cavity 410 via the feedstock inlet 201, may move, under its own gravity, till beneath the first opening 420 along the bottom wall of the cavity 410; in this way, if the feedstock has a density greater than the molten metal, the feedstock can be kept at the bottom wall of the cavity 410 without exiting the stirring disc 200 via the feedstock inlet 201 during up-and-down movement of the stirring disc 200; if the feedstock has a density smaller than that of the molten metal, the feedstock will float up to abut against the top wall of the cavity 410 after the stirring disc 200 is immersed in the molten metal, in which case since the floating feedstock is located beneath the first opening 420, it does not easily escape from the stirring disc 200 via the feedstock inlet 201.

Referring to FIGS. 5 to 10, based on the example embodiments described supra, in one implementation of the disclosure, the feedstock holding portion 400 further comprises a baffle plate 440, the baffle plate 440 being formed as extending from the cavity 410 between the feedstock inlet 201 and the first opening 420 towards the bottom wall of the cavity 410, both sides of the baffle plate 440 being connected to the sidewalls of the cavity 410. In a case that the density of the feedstock is lower than that of the molten metal, the feedstock will move upward after the stirring disc 200 is immersed in the molten metal; the baffle plate 440 serves to baffle the upward floating feedstock and limit the feedstock from moving towards the feedstock inlet 201. The feedstock before floating upward is located in the cavity 410 offset from the feedstock inlet 201; since the surface of the molten metal flows gently, the feedstock's upward floating follows a substantially vertically linear path, such that it does not easily move towards the direction of the feedstock inlet 201 during the upward floating process; even if the upward floating feedstock has a tendency of moving towards the feedstock inlet 201, it will be baffled and stopped by the lower end of the baffle plate 440 after floating upward a certain height, thereby avoiding the circumstance that the feedstock is separated from the stirring disc 200 during the process of immersing the stirring disc 200 in the molten metal. In addition, since both sides of the baffle plate 440 are connected to the sidewalls of the cavity 410, the feedstock cannot bypass the baffle plate 440 to move towards the feedstock inlet 201.

Figure 5:
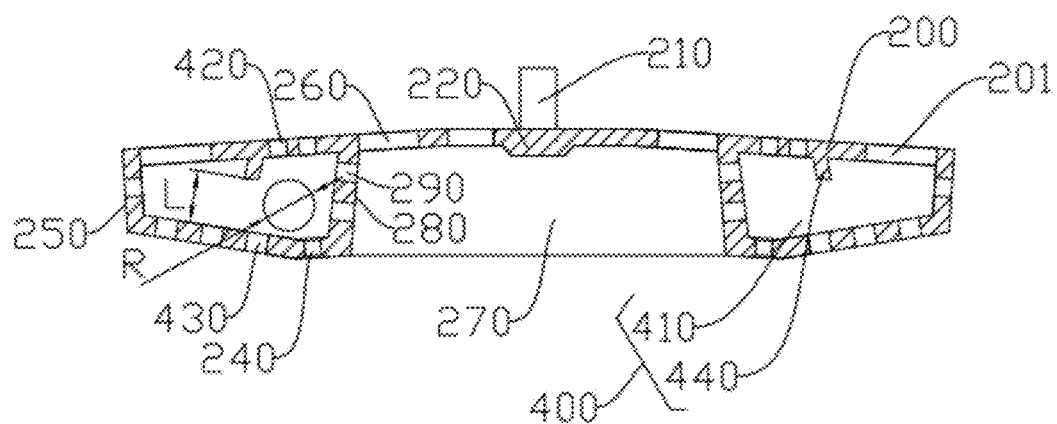
FIG. 5 is a sectional view of the stirring disc in some embodiments of the disclosure.
Figure 6:
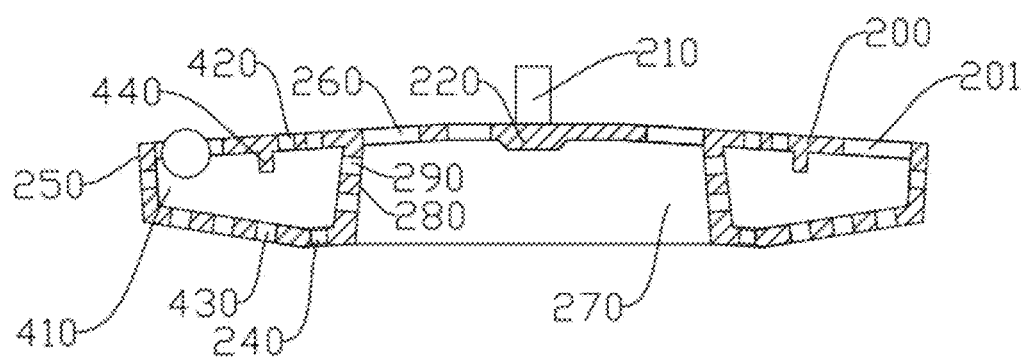
FIG. 6 is a sectional view of the stirring disc when feedstock is charged into a feedstock inlet in some embodiments of the disclosure.
Figure 7:
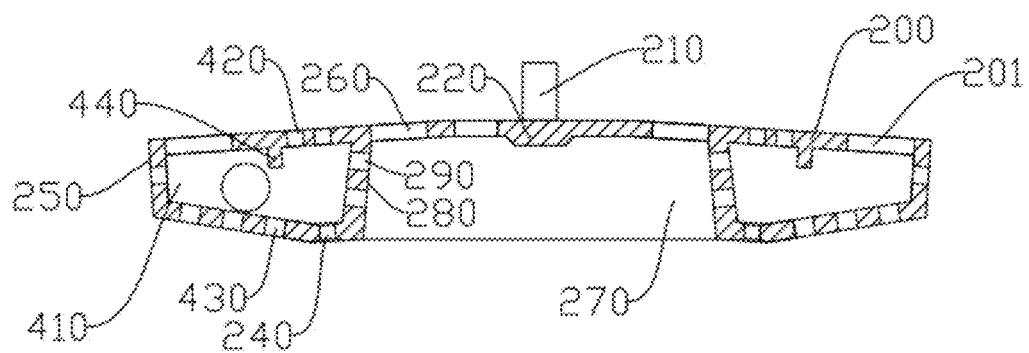
FIG. 7 is a sectional view of the stirring disc when feedstock enters a cavity in some embodiments of the disclosure.
Figure 8:
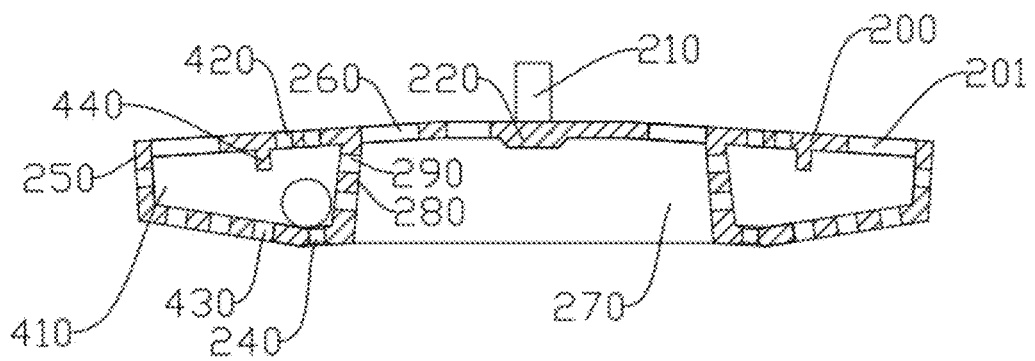
FIG. 8 is a sectional view of the stirring disc when feedstock rolls till below a first opening in some embodiments of the disclosure.
Figure 9:
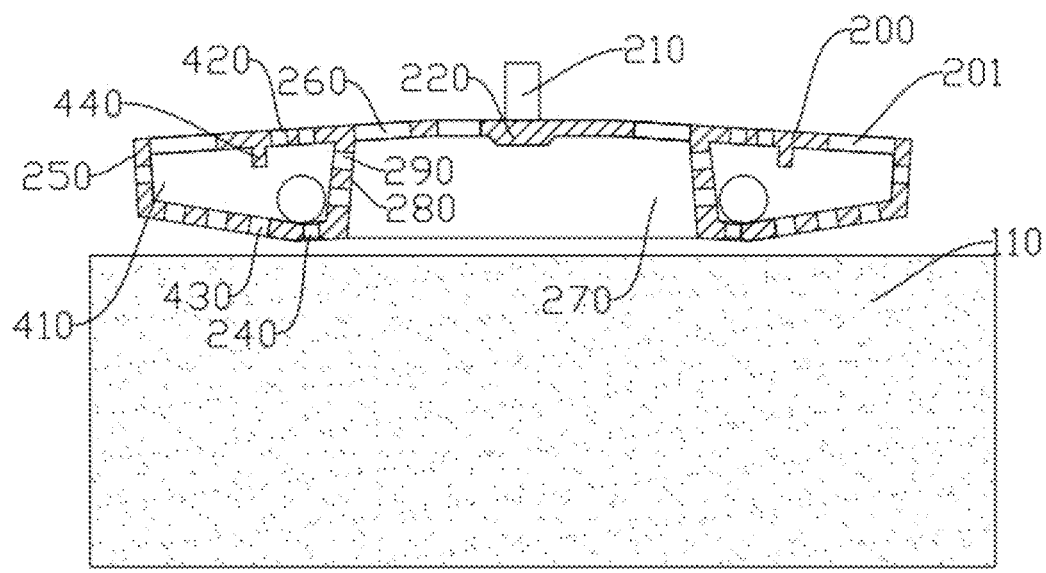
FIG. 9 is a sectional view of the stirring disc before being immersed in the molten metal in some embodiments of the disclosure.
Figure 10:
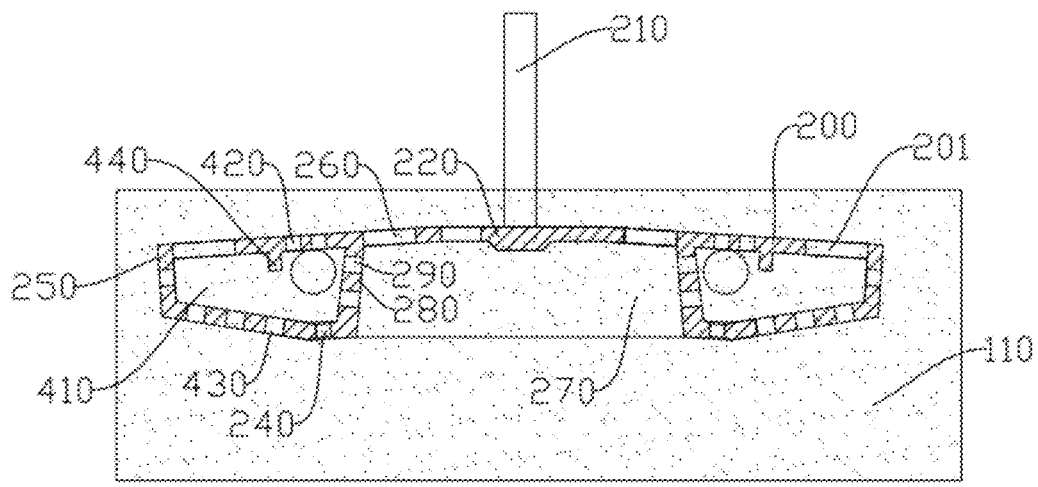
FIG. 10 is a sectional view of the stirring disc when being immersed in a molten metal in some embodiments of the disclosure.

Referring to FIG. 5, as a further technical solution, the baffle plate 440 tilts from top to bottom towards the direction of the feedstock inlet 201; the tilting design of the baffle plate 440 improves the feedstock baffling range of the lower end of the baffle plate 440, which may enhance the feedstock baffling performance of the lower end of the baffle plate 440 and thus may improve reliability.

Supposing that the minimal interval between the lower end of the baffle plate 440 and the bottom wall of the cavity 410 is L, the diameter of the feedstock is R, L<1.2R; with this design, the feedstock may be baffled by the baffle plate 440 after moving upward a small distance.

Figure 11:
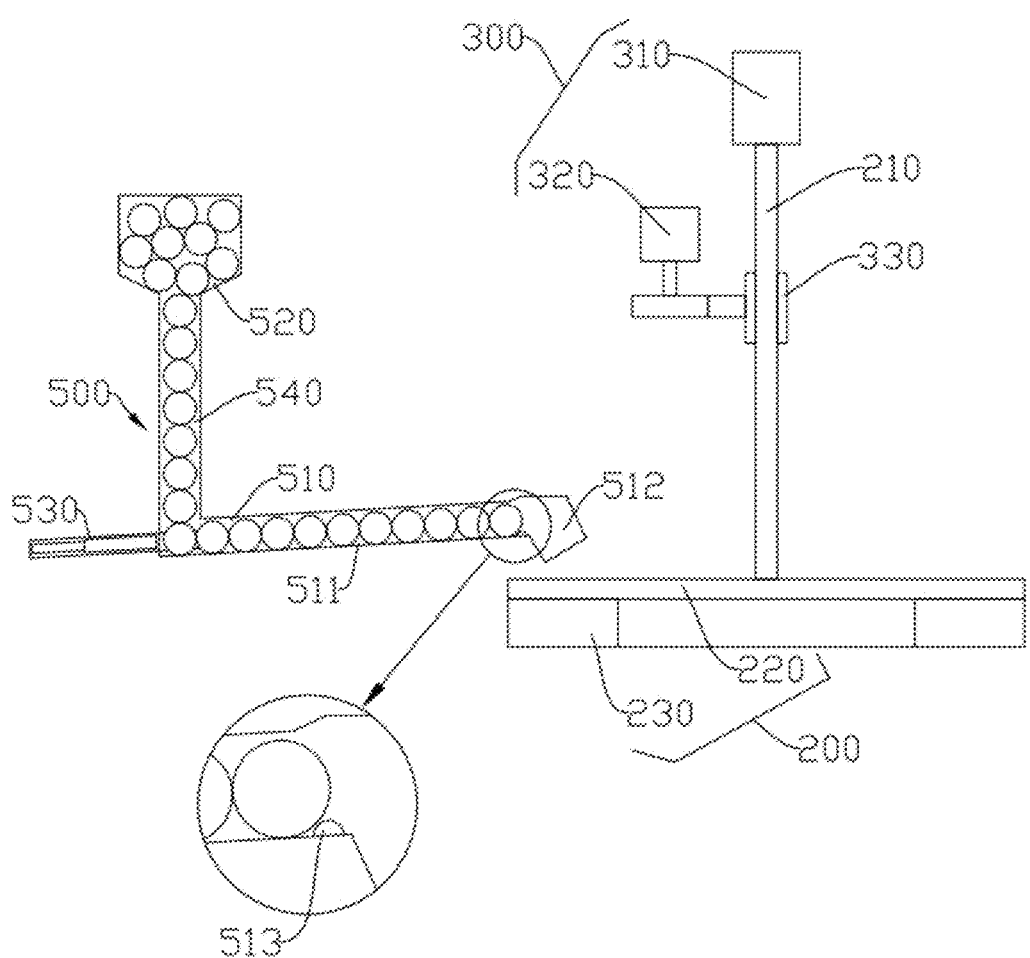
FIG. 11 is a structural schematic diagram of an automatic charger and a stirring device in some embodiments of the disclosure.

Referring to FIG. 11, based on the embodiments described supra, in one implementation of the disclosure, the drive device 300 comprises a lifting power element 310 and a rotating power element 320, a splined sleeve 330 fitting with the stirring rod 210 being sleeved over the stirring rod 210, the rotating power element 320 being configured to drive the splined sleeve 330 to rotate. Due to the splined-fit between the stirring rod 210 and the splined sleeve 330, the splined sleeve 330 does not limit up-and-down movement of the stirring rod 210 relative to the splined sleeve 330. The lifting power element 310 is configurable to generate a power driving the stilling rod 210 to move up and down, allowing for the stirring disc 200 to be immersed in or lifted out of the molten metal or allowing for the stirring disc 200 to move up and down in the molten metal; the rotating power element 320 is configurable to drive the splined sleeve 330 to rotate, such that the splined sleeve 330 drives the stirring disc 200 to rotate in the molten metal, enhancing feedstock homogeneity in the molten metal.

Referring to FIGS. 4 through 10, based on the embodiments described supra, in one implementation of the disclosure, the stirring disc 200 comprises a plurality of feedstock holding portions 400, and corresponding to the plurality of feedstock holding portions 400, a plurality of feedstock inlets 201 are provided on the stirring disc 200, the plurality of feedstock inlets 201 being arranged at intervals along the circumference of the stirring disc 200. Provision of the plurality of feedstock holding portions 400 allows for more feedstock to be carried by the stirring disc 200, which eliminates a need of frequent replenishment of feedstock. By arranging the feedstock holding portions 400 at intervals along the circumference of the stirring disc 200, feedstock can be replenished to different parts of the molten metal, such that the feedstock is homogeneously melted in the molten metal without incurring intensive fluctuation or flow of the molten metal.

Referring to FIGS. 5 through 11, based on the embodiments described supra, in one implementation of the disclosure, the stirring disc 200 comprises a disc body 220 connected to the stirring rod 210 and an annular boss 230 disposed at the bottom of the disc body 220, the height of the upper surface of the disc body 220 being gradually reduced from the stirring rod 210 to the periphery. The upper surface of the disc body 220 serves to guide the molten metal such that when the stirring disc 200 moves upward, the molten metal above the stirring disc 200 may be guided by the upper surface of the disc body 220 to flow towards the periphery of the disc body 220, which can reduce the magnitude of stirring the molten metal, and during the process of the stirring disc 200 exiting the molten metal, the molten metal left on the upper surface of the stirring disc 200 may be reduced so as to prevent the cooled molten metal from blocking the openings.

A drainage port 240 through the lower surface of the stirring disc 200 is provided at the intersection between the bottom wall of the cavity 410 and the sidewall of the cavity 410 proximal to the second opening 430, During the process of the stirring disc 200 exiting the molten metal, a part of the molten metal in the cavity 410 may be drained via the second opening 430 at the bottom wall of the cavity 410, and the remaining part of the molten metal flows from the bottom wall of the cavity 410 towards the sidewall of the cavity 410, converges there, and is drained via the drainage port 240; this may reduce the amount of molten metal left on the stirring disc 200.

An outer-ring wall 250 of the annular boss 230 is connected to the periphery of the disc body 220. The openings further comprise a third opening 260, the third opening 260 being located at a position on the disc body 220 corresponding to a circular space 270 enclosed by the annular boss 230, the bottom end of the annular boss 230 being connected to its outer-ring wall 250 via a conical surface, the bottom end of the annular boss 230 being connected to the top wall of the circular space 270 also via the conical surface, such that the lower end of the annular boss 230 is shrunk from top to bottom, while the circular space 270 is gradually flared from top to bottom.

The annular boss 230 protrudes from the bottom of the disc body 220, such that during the process of immersing the stirring disc 200 in the molten metal, the annular boss 230 first accesses the molten metal prior to the disc body 220; since the lower end of the annular boss 230 is tapered, the annular boss 230, during the process of being immersed in the molten metal, generates a reduced intensity in stirring the molten metal, without incurring an intensive fluctuation in the molten metal. The outer-ring wall 250 of the annular boss 230 is connected to the periphery of the disc body 220, such that the periphery of the disc body 220 does not protrude from the annular boss 230, which reduces the molten metal stirring magnitude at its peripheral portion during the process of immersing the disc body 220 in the molten metal, avoiding formation of a vortex around the stirring disc 200. When the annular boss 230 is completely immersed into the molten metal, the top wall of the circular space 270 will be exposed to the molten metal; provision of the third opening 260 allows for the molten metal to pass through the third opening 260, further reducing the molten metal stirring magnitude of the stirring disc 200. In addition, provision of the circular space 270 can also reduce the overall weight of the stirring disc 200, thereby reducing the load of the drive device 300. The sidewall of the circular space 270 serves to guide the molten metal, which can reduce the molten metal stirring magnitude of the top wall of the circular space 270.

A radial opening 290 communicating with the cavity 410 is further provided on the inner-ring wall 280 and the outer-ring wall 250 of the annular boss 230 so as to facilitate circulation of the molten metal in the cavity 410.

Figure 4:
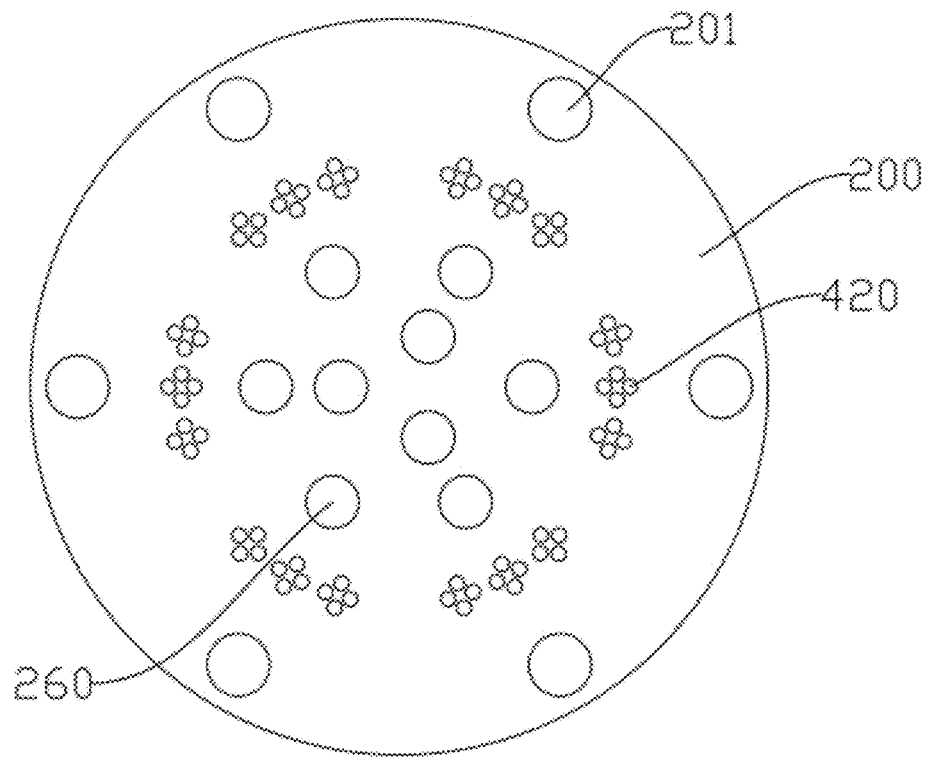
FIG. 4 is a top view of the stirring disc in some embodiments of the disclosure.

Referring to FIG. 4 through FIG. 10, based on the example embodiments described supra, in one implementation of the disclosure, a plurality of third openings 260 are provided on the top wall of the circular space 270, the plurality of third openings 260 being disposed at intervals along the circumference of the stirring rod 210, the plurality of third openings 260 being arranged into a plurality of groups along concentric circles, as illustrated in FIG. 4. FIG. 4 illustrates two groups of third openings disposed on the stirring disc 200, one group thereof including three third openings 260, the other group thereof including six third openings 260. Among the plurality of groups of third openings, the portion of the top wall of the circular space 270 around the first group of third openings is higher than remaining portions of the top wall of the circular space 270 (as illustrated in FIG. 4, the group of the two groups of third openings closer to the stirring rod are located at the highest position), such that during the process of immersing the stirring disc 200 into the molten metal, the gas in the circular space 270 is discharged via that group of third openings.

Figure 12:
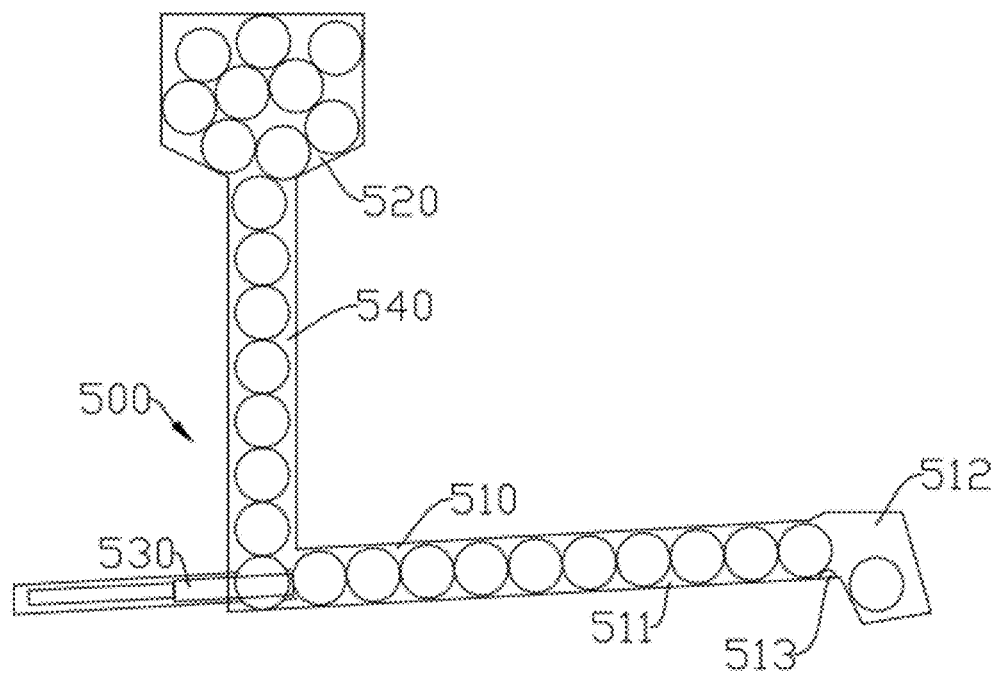
FIG. 12 is a structural schematic diagram of the automatic charger in some embodiments of the disclosure.
Figure 13:
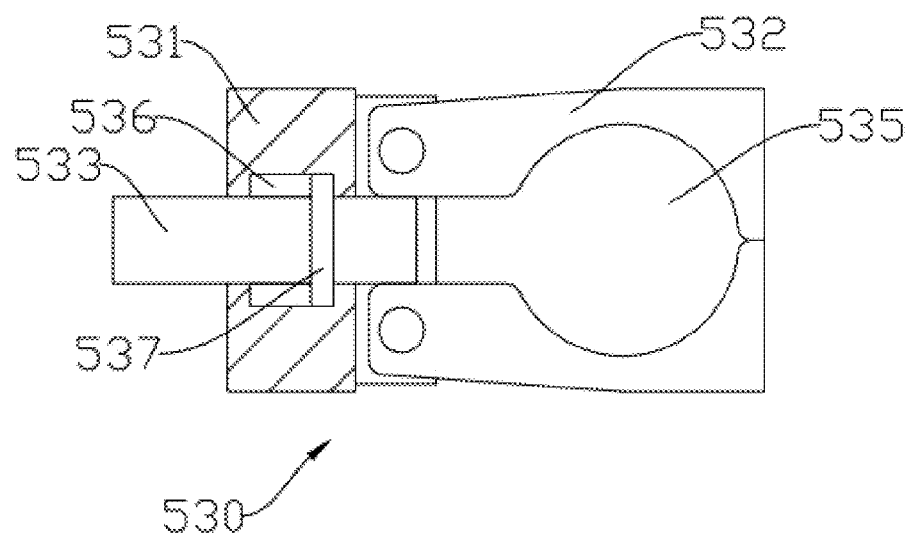
FIG. 13 is a structural schematic diagram of a pusher with a pushing ram extending out of the base in some embodiments of the disclosure.
Figure 14:
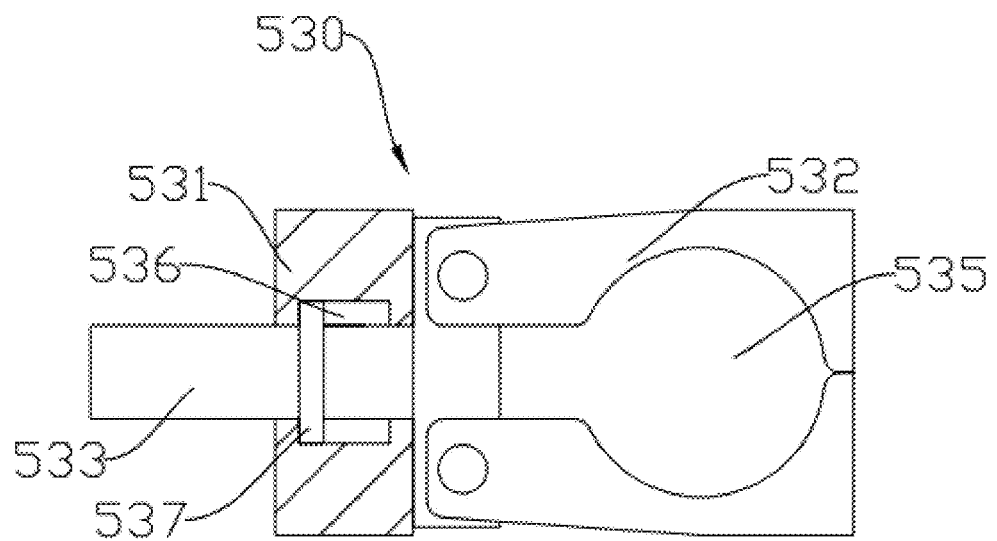
FIG. 14 is a structural schematic diagram of the pusher with the pushing ram being retracted to the base in some embodiments of the disclosure.
Figure 15:
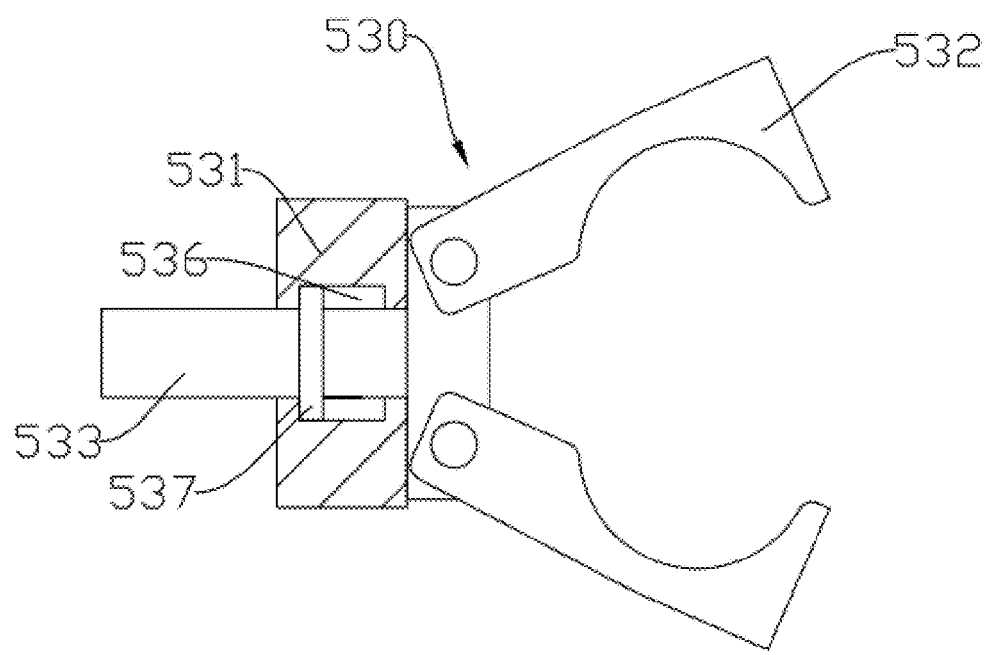
FIG. 15 is a structural schematic diagram of the pusher with a pushing arm being deployed in some embodiments of the disclosure.
Figure 16:
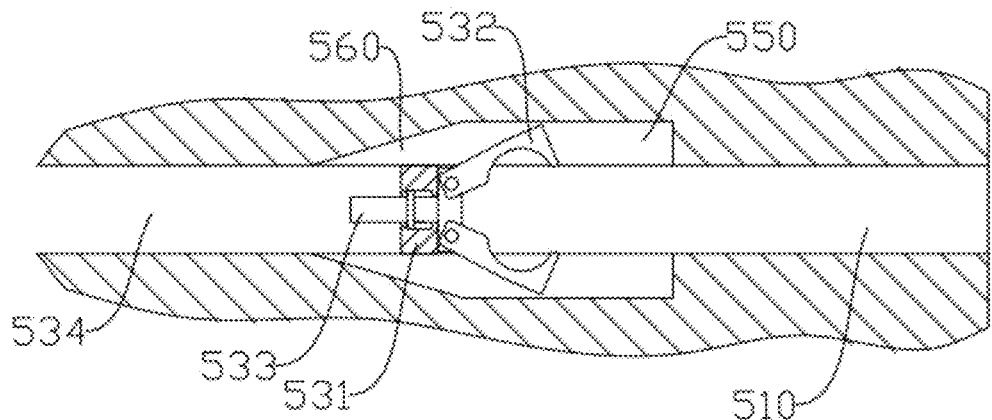
FIG. 16 is a structural schematic diagram when the pushing arm is disposed in an avoidance groove in some embodiments of the disclosure.
Figure 17:
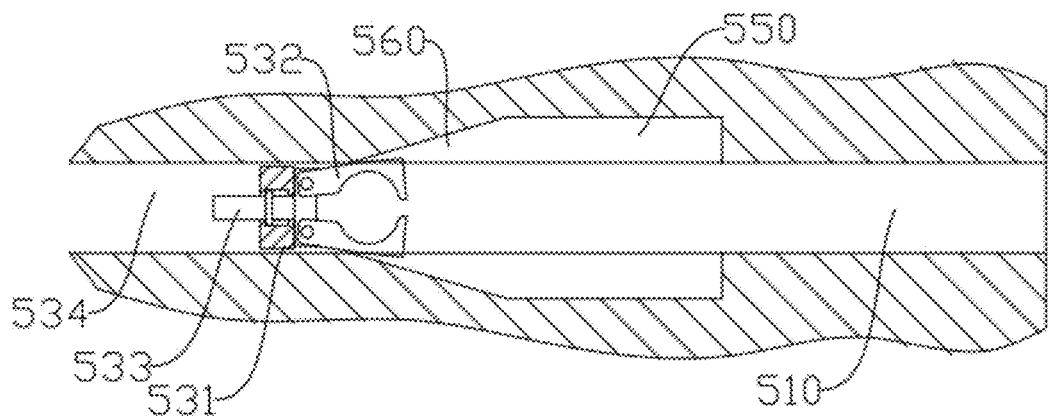
FIG. 17 is a structural schematic diagram when the pushing arm is disposed in a guide groove in some embodiments of the disclosure.
Figure 18:
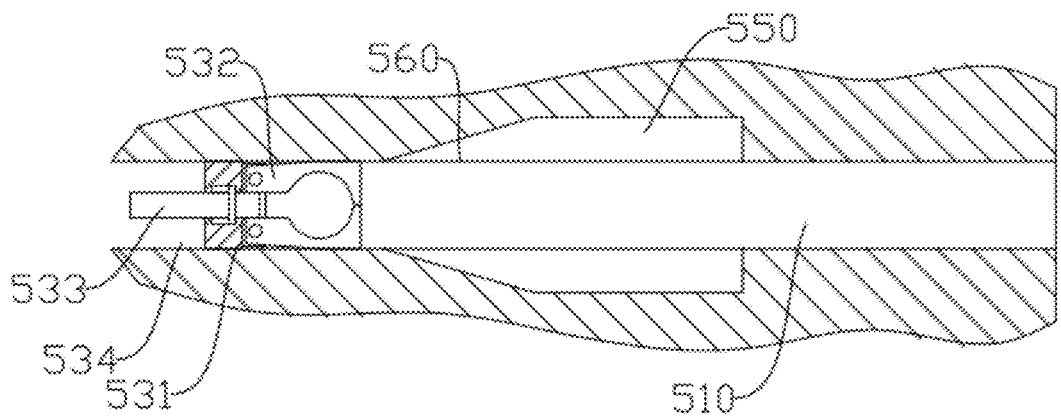
FIG. 18 is a structural schematic diagram when the pusher is disposed in a slide groove and the pushing arm is folded in some embodiments of the disclosure.

Referring to FIGS. 11 through 13, based on the example embodiments described supra, in one implementation thereof, the metal melting furnace further comprises an automatic charger 500 configured to replenish feedstock to the feedstock holding portion 400, the rotating power element 320 driving the stirring disc 200 to rotate intermittently to replenish the feedstock to each feedstock holding portion 400. The automatic charger 500 allows for automatic replenishment of the feedstock to the stirring disc 200, which eliminates manual charging, thereby enhancing operation safety as well as operation efficiency. Since a plurality of feedstock holding portions 400 are arranged on the stirring disc 200, during the feedstock replenishing process, the rotating power element 320 drives the stirring disc 200 to rotate to switch the feedstock holding portion 400 to be aligned to the automatic charger 500, whereby the feedstock is replenished to each feedstock holding portion 400 piece by piece. During the charging process, the stirring disc 200 rotates intermittently, such that during the process of the feedstock falling into the cavity 410, the stirring disc 200 and the automatic charger 500 are relatively still, avoiding offset when the feedstock drops off.

In one implementation, the automatic charger 500 comprises an outlet path 510, a feedstock reservoir 520 communicating with the outlet path 510, and a pusher 530, the pusher 530 being configured to push the feedstock in the outlet path 510 such that the feedstock falls onto the feedstock holding portion 400. The feedstock reservoir 520 communicates with the outlet path 510, such that the feedstock in the feedstock reservoir 520 can access the outlet path 510; the pusher 530 may push the feedstock in the outlet path 510 such that the feedstock is pushed out of the outlet path 510 and enters the cavity 410 via the feedstock inlet 201, thereby realizing automatic replenishment of the feedstock.

In the implementation above, the outlet path 510 comprises a rising segment 511 and a descending segment 512, bottom walls of the rising segment 511 and the descending segment 512 being both inclined surfaces; in the direction from the rising segment 511 to the descending segment 512, the bottom wall of the rising segment 511 is an upward inclined surface, such that the feedstock may be kept in the rising segment 511 without autonomously entering the descending segment 512; the bottom wall of the descending segment 512 towards the direction away from the rising segment 511 is a descending inclined surface, such that after the pusher 530 pushes the feedstock from the rising segment 511 to the descending segment 512, the feedstock may roll out of the outlet path 510 along the bottom wall of the descending segment 512 under its own gravity.

A plurality of pieces of feedstock may be stored in the rising segment 511; during return movement of the pusher 530, the feedstock in the rising segment 511 also has a tendency of moving backward, which would affect replenishment of the feedstock from the feedstock reservoir 520 into the outlet path 510. To solve this problem, in one implementation of the disclosure, the pusher 530 comprises a base 531, two pushing arms 532 rotatably mounted on the base 531, and a pushing ram 533 configured to push the base 531. The automatic charger 500 further comprises a slide groove 534 communicating with the outlet path 510 for the pusher 530 to enter/exit the outlet path 510. The two pushing arms 532 are folded when pushing the feedstock, and the two folded pushing arms 532 can also enclose an avoidance hole 535. The feedstock reservoir 520 is disposed above the outlet path 510 and communicates with the outlet path 510 via a vertical feed path 540. The feedstock in the feedstock reservoir 520 enters the outlet path 510 via the avoidance hole 535. During return movement of the pusher 530, the two pushing arms 532 are deployed so as to be separated from the feedstock in the avoidance hole 535. The pushing ram 533 may push the base 531 to drive the pushing arms 532 to move; the pushing arms 532 may extend out of the slide groove 534 along with the base 531 to access the outlet path 510; during the pushing process, the pushing arms 532 are kept folded so as to push the feedstock in the outlet path 510 such that the feedstock moves forward and falls onto the feedstock holding portion 400 from the outlet path 510; since the two folded pushing arms 532 can enclose the avoidance hole 535, the feedstock in the feed path 540 can fall off and pass through the avoidance hole 535 during the process of the pushing arms 532 pushing the feedstock and then enters the outlet path 510, whereby replenishment of the feedstock into the outlet path 510 is completed; during return movement of the pusher 530, the two pushing arms 532 are deployed to be separated from the feedstock, such that the pushing arms 532 may be retracted into the slide groove 534.

A protrusion portion 513 is provided at a portion of the rising segment 511 connected to the descending segment 512; the protrusion portion 513 is configured to block the feedstock. The feedstock, when being pushed, may cross the protrusion portion 513 to enter the descending segment 512; therefore, the protrusion portion 513 may avoid the feedstock from autonomously entering the descending segment 512. The upper surface of the protrusion portion 513 is a convex arc surface.

Referring to FIGS. 12 through 18, based on the example embodiments described supra, in one implementation of the disclosure, to push the feedstock, an end portion of the pushing ram 533 extends out of the base 531 till between the two pushing arms 532 to stop rotation of the pushing arms 532; upon return movement, the end portion of the pushing ram 533 is retracted into the base 531; after the feedstock pushes the two pushing aims 532 to be deployed, the pusher 530 is separated from the feedstock. An avoidance groove 550 for avoiding the pushing arms 532 is provided at a sidewall of the outlet path 510, and a guide groove 560 connected to the avoidance groove 550 is provided at a sidewall of the slide groove 534. In the return movement direction of the pusher 530, the guide groove 560 is shrunk to push the two pushing arms 532 to be folded. The end portion of the pushing ram 533 may extend out of the base 531 during the pushing process. The end portion of the pushing ram 533 is disposed between the two pushing arms 532 so as to be capable of stopping the two pushing arms 532, whereby rotation of the two pushing arms 532 is limited such that the two pushing arms 532 can be kept in a folded state so as to push the feedstock to move. Upon return movement, since the end portion of the pushing ram 533 has been retracted in the base, rotation of the two pushing arms 532 is not limited. Since the size of the feedstock is greater than that of the slide groove 534, the feedstock cannot access the slide groove 534; therefore, during return movement of the pusher 530, a mutually compressive force occurs between the pushing arms 532 and the feedstock, where the compressive force causes the two pushing arms 532 to be separated and deployed, thereby being separated from the feedstock. The avoidance groove 550 may provide a space for deployment of the pushing arms 532. The guide groove 560 is connected to the avoidance groove 550, such that the deployed pushing arms 532 may enter the guide groove 560 from the avoidance groove 550. As the base 531 moves, the pushing arms 532 will contact the inner wall of the guide groove 560 and be gradually pushed by the inner wall of the guide groove 560, such that the two pushing arms 532 move close to each other to be refolded.

A limiting groove 536 is provided in the base 531, and a limiting protrusion 537 is provided on the pushing ram 533. The limiting protrusion 537 may abut against the inner wall of the limiting groove 536 so as to keep the pushing ram 533 on the base 531. The pushing ram 533 is extensible relative to the base 531; after the pushing ram 533 is retracted, the limiting protrusion 537 abuts against the inner wall of the limiting groove 536 such that the pushing ram 533 can bring the base 531 to move together.

Figure 2:
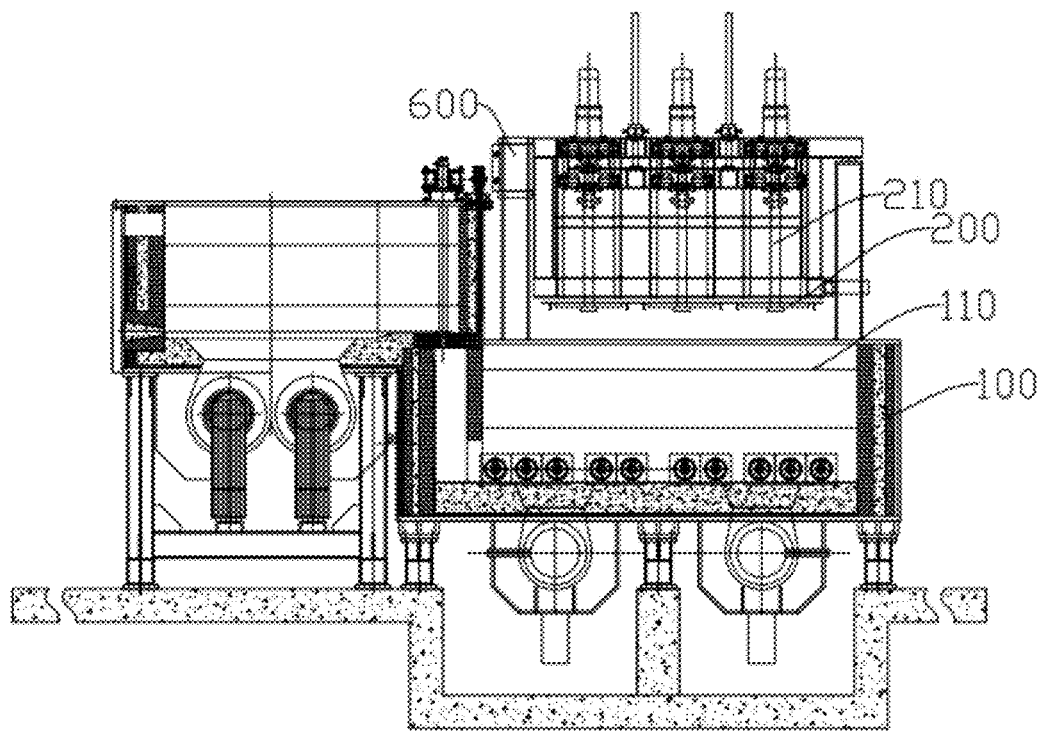
FIG. 2 is a structural schematic diagram of the metal melting furnace including a stirring device when the stirring disc moves upward in some embodiments of the disclosure.
Figure 3:
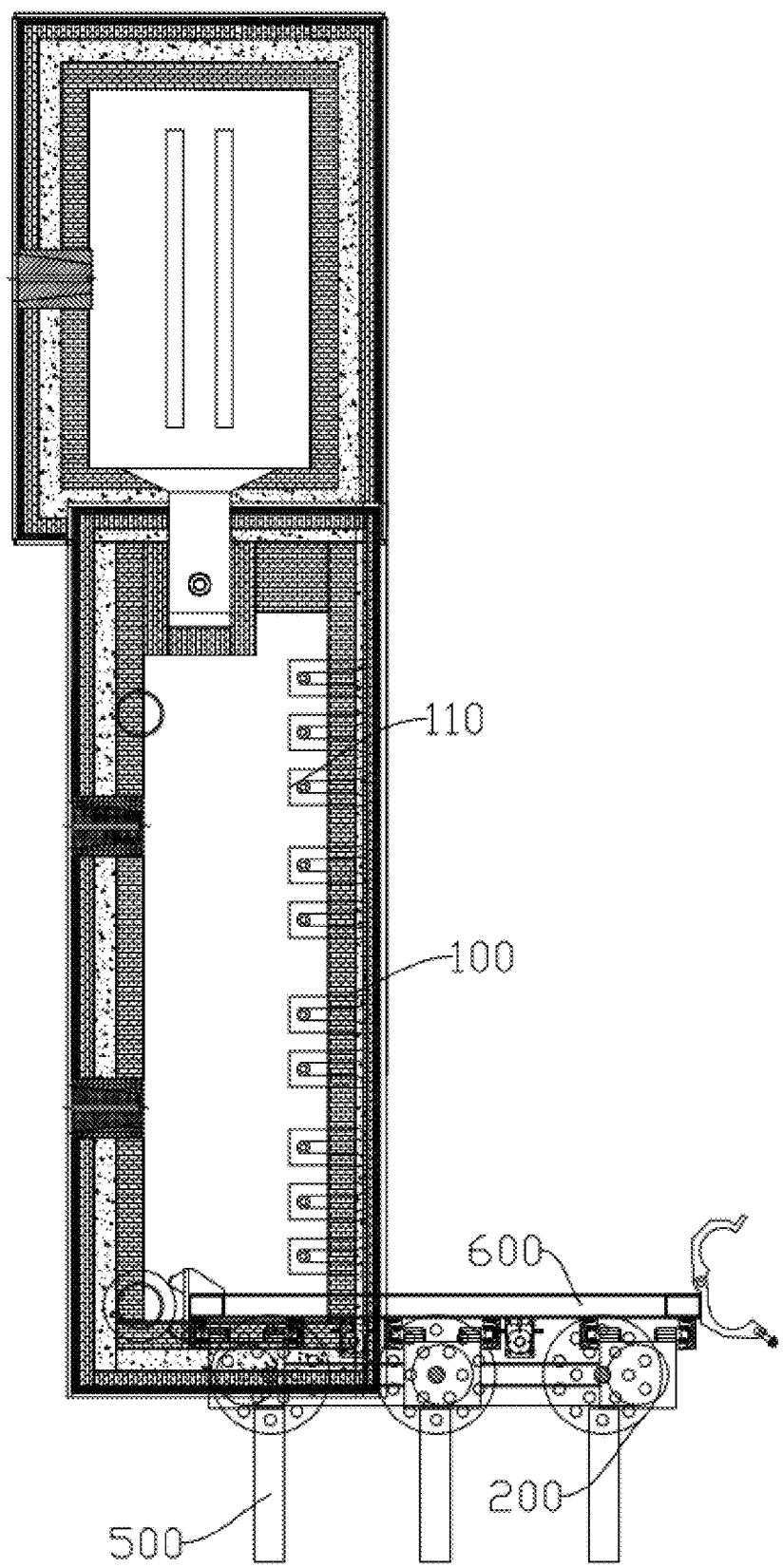
FIG. 3 is a top view of the metal melting furnace including a stirring device in some embodiments of the disclosure.

Referring to FIGS. 1 through 3, based on the example embodiments described supra, in one implementation of the disclosure, the metal melting furnace including a stirring device further comprises a rotating chassis 600 rotatably mounted on the furnace body 100, the stirring device being provided on the rotating chassis 600, the automatic charger 500 being disposed at a side portion of the furnace body 100, the rotating chassis 600 bringing the stirring disc 200 to rotate till beneath the automatic charger 500 so as to replenish the feedstock. As the rotating chassis 600 rotates, it can bring the stirring disc 200 to rotate together, such that the stirring disc 200 can be aligned to the automatic charger 500 for automatic charging; after the stirring disc 200 completes feedstock replenishment to the molten metal, the rotating chassis 600 may also move the stirring disc 200 out of the furnace body 100 for being cooled, avoiding a circumstance that the stirring disc 200 is kept at a high temperature due to the high-temperature molten metal such that the feedstock is oxidized under the high temperature during loading process of the stirring disc 200.

Figure 19:
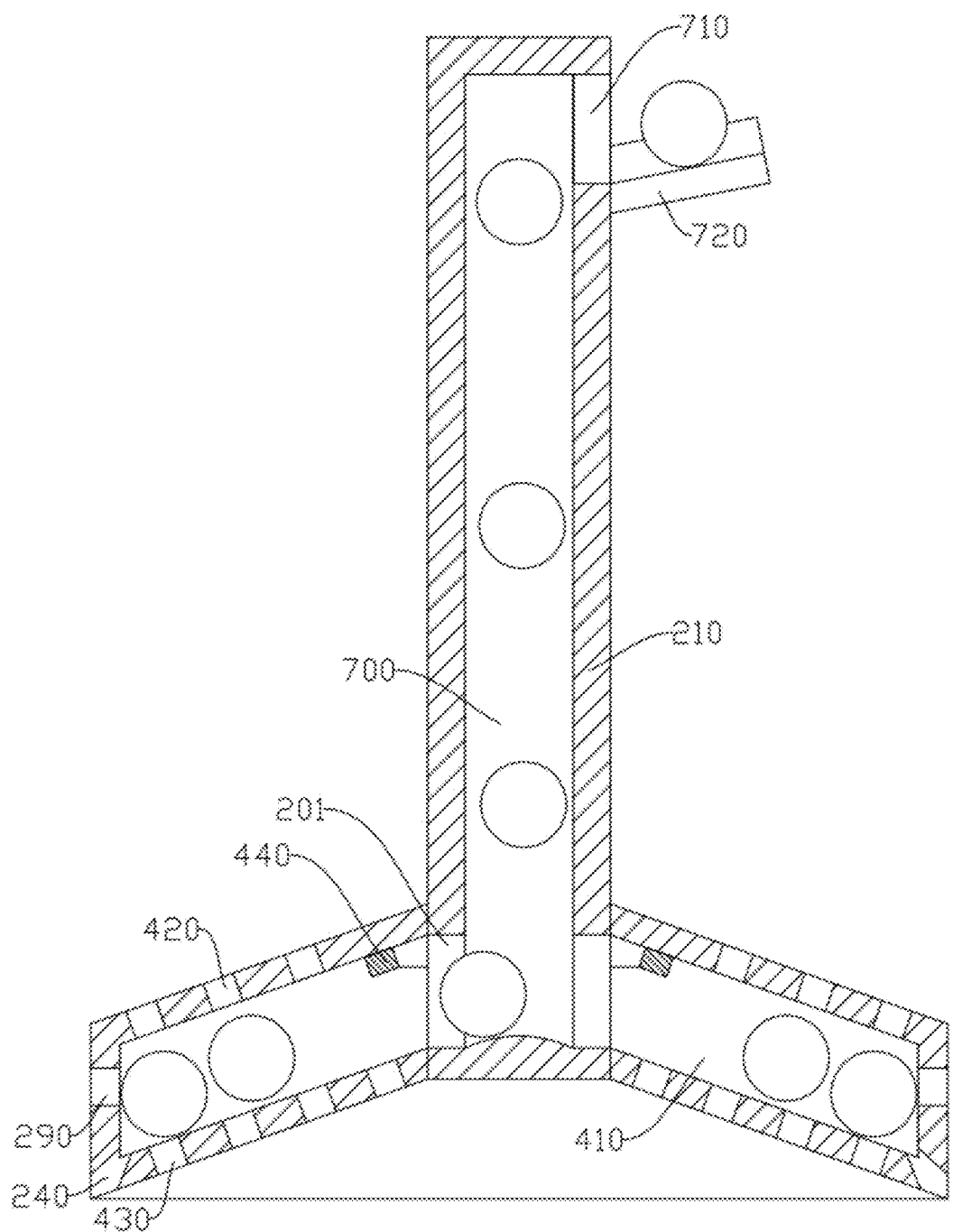
FIG. 19 is a structural schematic diagram of an automatic charging device and a stirring device in some embodiments of the disclosure.

As illustrated in FIG. 19, different from the example embodiments described supra, in another implementation of the disclosure, there is further provided another type of stirring device and an automatic charging device capable of replenishing feedstock to the feedstock holding portion 400, the automatic charging device comprising an inlet path 700 provided in the stirring rod 210 along an axial line of the stirring rod 210 and a feedstock replenishing port 710 communicating with the inlet path 700, the cavity 410 of the feedstock holding portion 400 communicating with the inlet path 700. Upon feedstock replenishment, the feedstock is loaded to the inlet path 700 via the feedstock replenishing port 710 such that the feedstock falls off along the inlet path 700 to be thereby replenished into the cavity 410. The bottom wall of the inlet path 700 has a convex arc shape, which may guide the feedstock to move towards the feedstock holding portion 400.

In one implementation of the disclosure, the feedstock inlet 201 is disposed at a side of the cavity 401 proximal to the stirring rod 210, the feedstock inlet 201 communicating with the inlet path 700, the cavity 410 being of a ring shape, the baffle plate 440 on the top wall of the cavity 410 being provided as an annular protrusion rib. During the charging process, the stirring rod 210 may rotate such that the feedstock entering the cavity 410 rolls in the cavity 410, which results in homogeneous distribution of the feedstock and meanwhile avoids the feedstock from blocking the feedstock inlet 201 causing the feedstock accumulated in the inlet path 700. The bottom wall of the cavity 410 tilts outward gradually downward from the stirring rod 210, which avoids accumulation of the feedstock around the feedstock inlet 201. A feedstock guide chute 720 connected to the feedstock replenishing port 710 is provided at the outer side of the stirring rod 210, such that an external feedstock storage device may transfer the feedstock to the feedstock guide chute 720, and then the feedstock guide chute 720 guides the feedstock into the inlet path 700.

Figure 20:
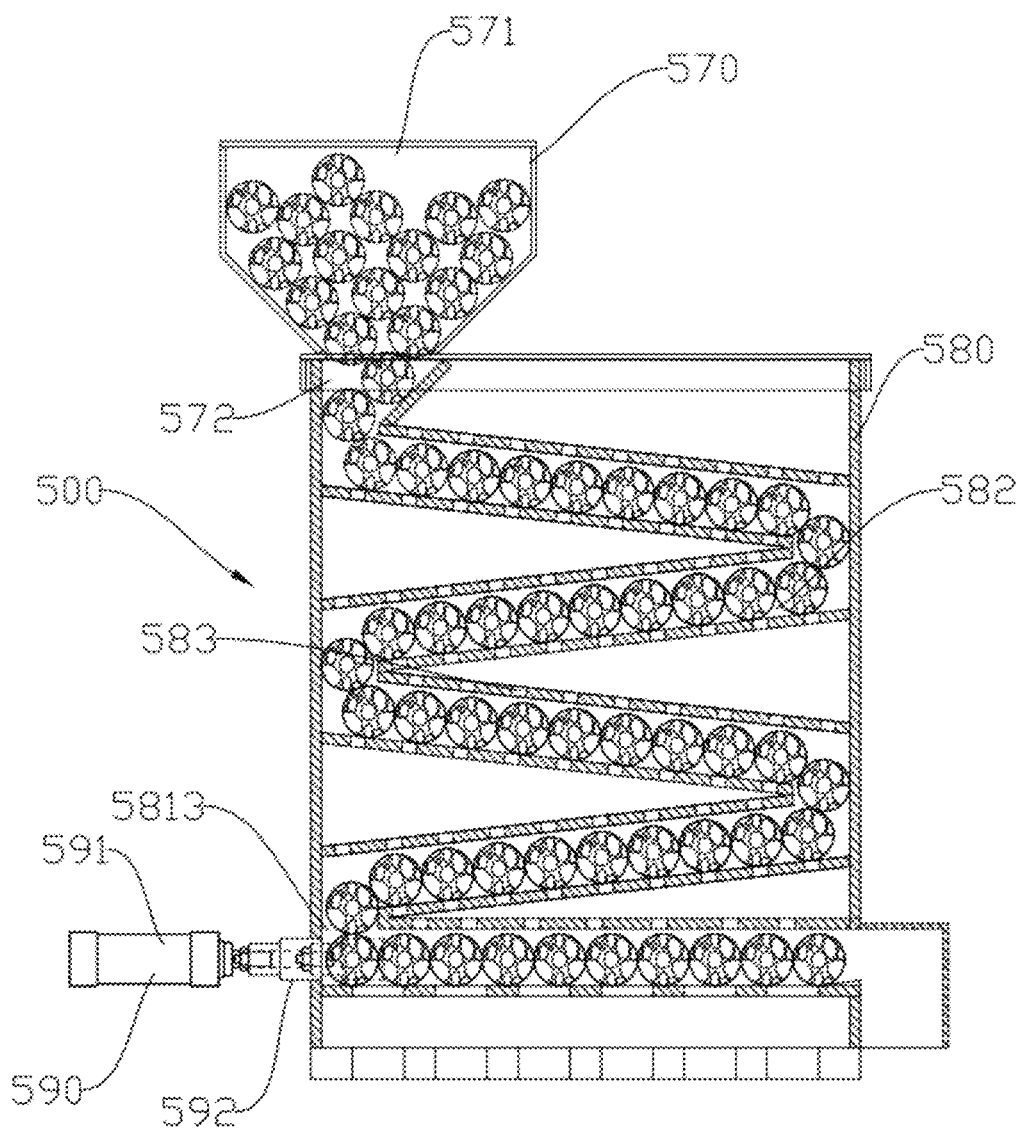
FIG. 20 is a structural schematic diagram of another automatic charger in some embodiments of the disclosure.

FIG. 20 illustrates another type of automatic charger 500 according to some embodiments of the disclosure, the automatic charger 500 comprising a hopper 570, a buffer bin 580, and a pushing mechanism 590, the hopper 570 being provided with a inlet opening 571 and an outlet opening 572, a buffer channel 581 being provided in the buffer bin 580, one end of the buffer channel 581 being provided with a feed port 5813 communicating with the outlet opening 572, the other end of the buffer channel 581 being in communication with the feedstock inlet 201 of the feedstock holding portion 400; the pushing mechanism 590 is configured to push the feedstock in the buffer channel 581 sequentially into the feedstock inlet 201 of the feedstock holding portion 400, the pushing mechanism 590 comprising a drive 591 and a pushing element 592, the drive 591 driving the pushing element 592 to perform a reciprocating movement in the buffer channel 581 to sequentially push the feedstock in the buffer channel 581 into the feedstock inlet 201.

In the technical solution above, the feedstock may be first inputted into the hopper 570 via the inlet opening 571, which may be done manually or automatically by a mechanical device. The feedstock in the hopper 570 sequentially enters the buffer channel 581 via the outlet opening 572, and then the pushing mechanism 590 sequentially pushes the feedstock in the buffer channel 581 into the feedstock inlet 201. Each reciprocating movement of the pusher 592 allows for a certain amount of feedstock to be pushed into the feedstock inlet 201; therefore, by controlling the number of reciprocating times of the pushing element 592, the quantity of feedstock to be charged can be accurately controlled. Since the mass of each piece of feedstock is substantially consistent, accurate control of the feedstock charging amount may be realized via this technical solution. The drive 591 is fixed to the outer sidewall of the buffer bin 580, and the pushing element 592 and the buffer bin 580 are slidingly connected.

A plurality of storage channels 582 are further inclinedly provided in the buffer bin 580, the plurality of storage channels 582 being sequentially arranged in the vertical direction, where in two neighboring storage channels 582, the lower end of the upper storage channel 582 communicates with the upper end of the lower storage channel 582, the lowest storage channel 582 is disposed above the buffer channel 581, the upper end of the uppermost storage channel 582 communicates with the outlet opening 572, and the lower end of the storage channel 582 communicates with the buffer channel 581. The storage channels 582 are configurable to store a part of feedstock, thereby increasing the quantity of pre-stored feedstock.

A plurality of through bores 583 are provided on both of the inner wall of the buffer channel 581 and the inner wall of the storage channel 582 such that high-temperature gas in the furnace body 100 can access the buffer bin 580 and then enter the buffer channel 581 and the storage channel 582 via the through bores 583 so as to preheat the feedstock in the buffer bin 580; in this way, the heat of the high-temperature gas discharged from the inside of the furnace body 100 may be sufficiently recycled to save energy; in addition, preheating the feedstock may reduce the melting time in the chamber 110, thereby enhancing efficiency. The buffer bin 580 is provided with a gas outlet for discharging the high-temperature gas.

Figure 21:
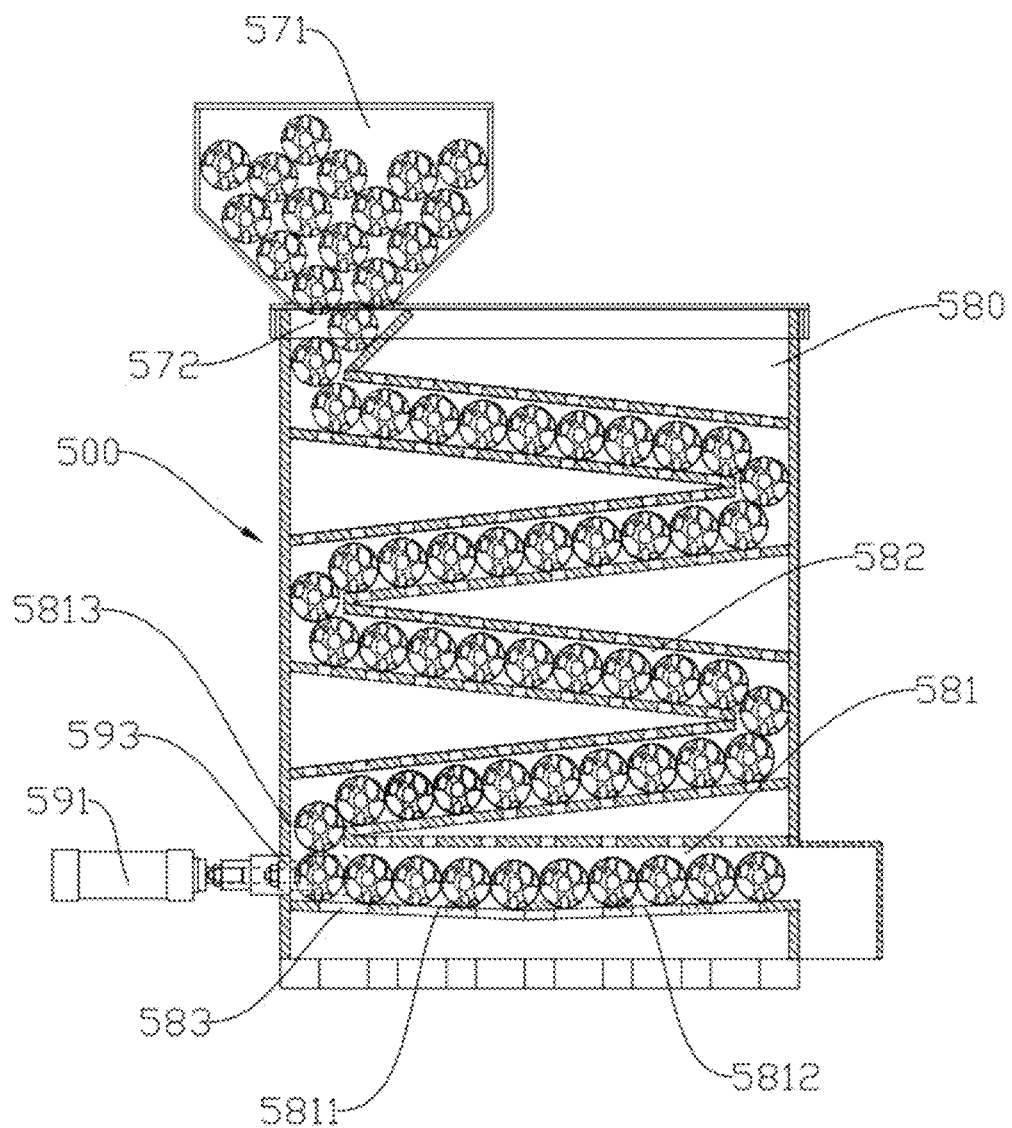
FIG. 21 is a structural schematic diagram of a further automatic charger in some embodiments of the disclosure.

As illustrated in FIG. 21, based on the example embodiments described supra, in one implementation thereof, the pushing element 592 is disposed beneath the feed port 5813. The buffer channel 581 comprises a forward tilting segment 5811 and a backward tilting segment 5812, the forward tilting segment 5811 being disposed at the side proximal to the pushing mechanism 590, the backward tilting segment 5812 being disposed at the side proximal to the feedstock inlet 201, the bottom surface of the forward tilting segment 5811 being disposed to tilt from top to bottom towards the direction of the feedstock holding portion 400, the bottom surface of the backward tilting segment 5812 being disposed to tilt from bottom to top towards the direction of the feedstock holding portion 400.

Tilting arrangement of the bottom surface of the forward tilting segment 5811 from top to bottom towards the direction of the feedstock holding portion 400 allows for the feedstock in the forward tilting segment 5811 to move towards the side of the feedstock holding portion 400; as the pushing element 592 is being retracted, this tilting arrangement may prevent the feedstock from moving back with the pushing element 592, such that the feedstock in the storage channel 582 may smoothly fall into the buffer channel 581. Tilting arrangement of the bottom surface of the backward tilting segment 5812 from bottom to top towards the direction of the feedstock holding portion 400 may prevent the feedstock not pushed into the feedstock holding portion 400 in the backward tilting segment 5812 from being pushed out of the buffer channel 581 due to inertance when the pushing element 592 extends out.

The forward tilting segment 5811 and the backward tilting segment 5812 may be directly connected or connected via a horizontally disposed horizontal segment.

Figure 22:
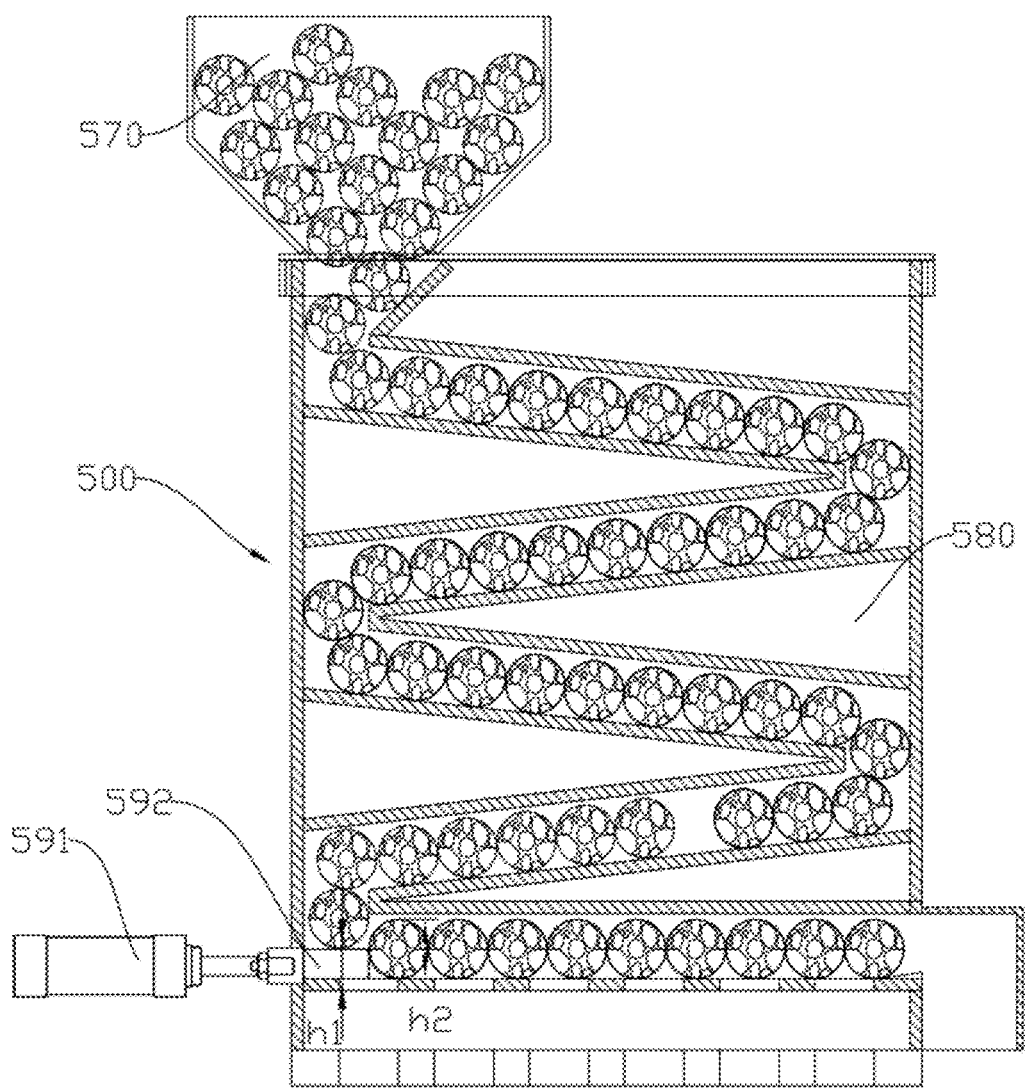
FIG. 22 is a structural schematic diagram of a still further automatic charger in some embodiments of the disclosure.
Figure 23:
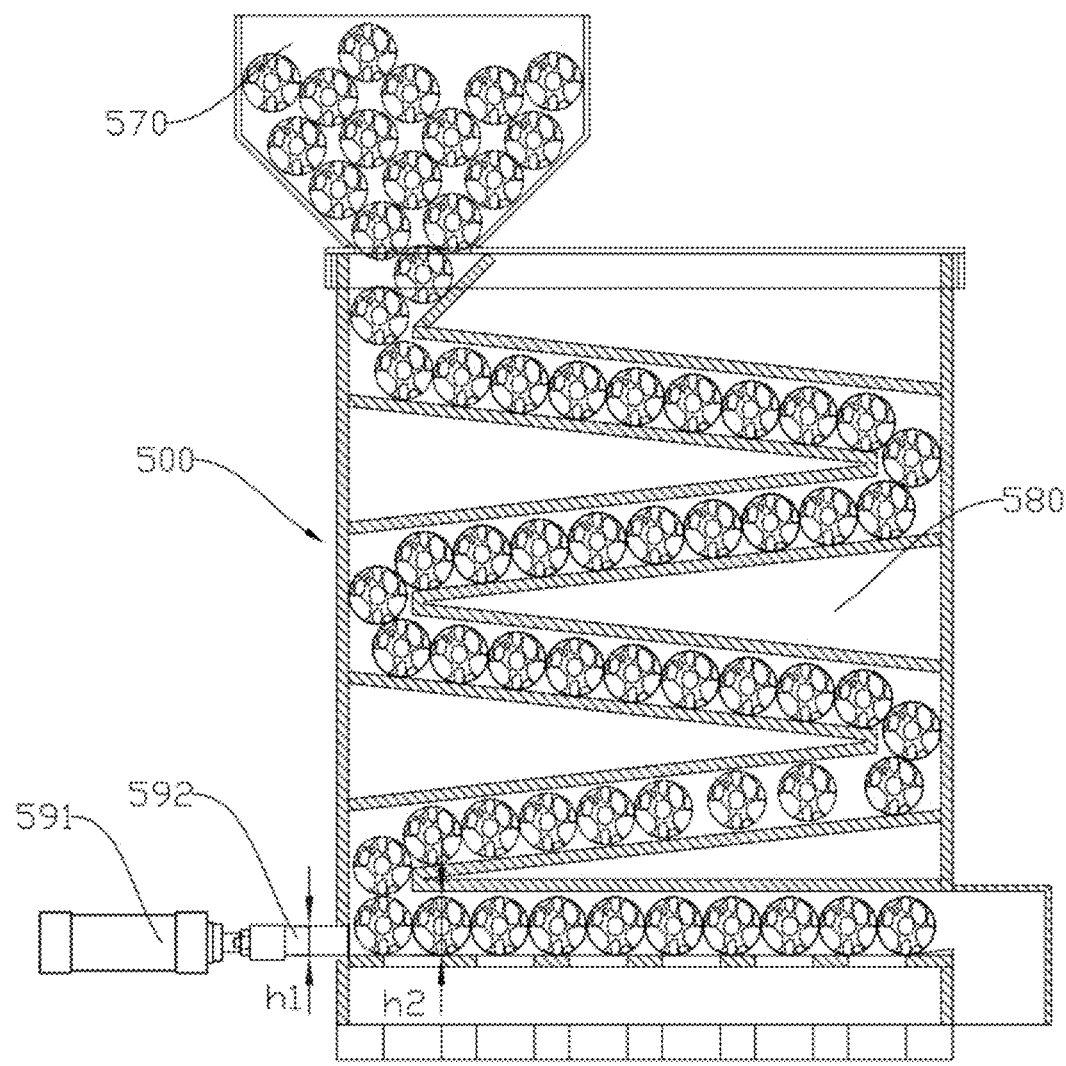
FIG. 23 is a structural schematic diagram of a yet further automatic charger in some embodiments of the disclosure.

As illustrated in FIGS. 22 and 23, based on the example embodiments described supra, in one implementation of the disclosure, a height of the upper end surface of the pushing element 592 relative to the bottom surface of the buffer channel 581 is h1, a height of the feedstock in the buffer channel 581 relative to the bottom surface of the buffer channel 581 is h2, and h2≥h1, such that when the pushing element 592 extends out, at least a part of the feedstock above the buffer channel 581 enters the buffer channel 581 and accesses the upper end surface of the pushing element 592.

When the pushing element 592 extends out, the feedstock below the feed port 5813 will be pushed forward, while when the pushing element 592 is being retracted, the feedstock rolls back till under or below the feed port 5813 along with the pushing element 592, and the rolling-back feedstock will block the feedstock above the feed port 5813 from falling off into the buffer channel 581 and be stuck at the teed port 5813; as a result, the feedstock in the buffer channel 581 fails to be replenished, and thereafter, when the pushing element 592 extends out again, since the buffer channel 581 has no new feedstock replenished, there will be no feedstock to be pushed from the buffer channel 581 into the feedstock holding portion 400, such that the automatic charger 500 cannot charge the feedstock smoothly. In this implementation, when the pushing element 592 extends out, the feedstock in the buffer channel 581 may be pushed into the feedstock inlet 201; meanwhile, the feedstock above the pushing element 592 will enter the buffer channel 581 via the feed port 5813 and access the upper end surface of the pushing element 592, and then when the pushing element 592 is being retracted, the feedstock having fallen on the pushing element 592 may block the feedstock in the buffer channel 581 from moving backward; after the pushing element 592 is retracted, the feedstock on the pushing element 592 may continuously move downward under the gravity and access the bottom surface of the buffer channel 581, thereby completing the feeding.

In some implementations of the disclosure, h2≥2h1. This solution enables the feedstock above the pushing element 592 to fail into the buffer channel 581 as much as possible when the pushing element 592 extends out, thereby increasing the baffling effect of the feedstock above the pushing element 592 with respect to the feedstock in the buffer channel 581, such that the feedstock above the feed port 5813 enters the buffer channel 581 more smoothly; in order to prevent the feedstock in the buffer channel 581 from rolling into the feedstock holding portion 400 before the pushing element 592 pushes the feedstock, the bottom surface of the buffer channel 581 tilts from bottom to top towards the direction of the feedstock holding portion 400.

Figure 24:
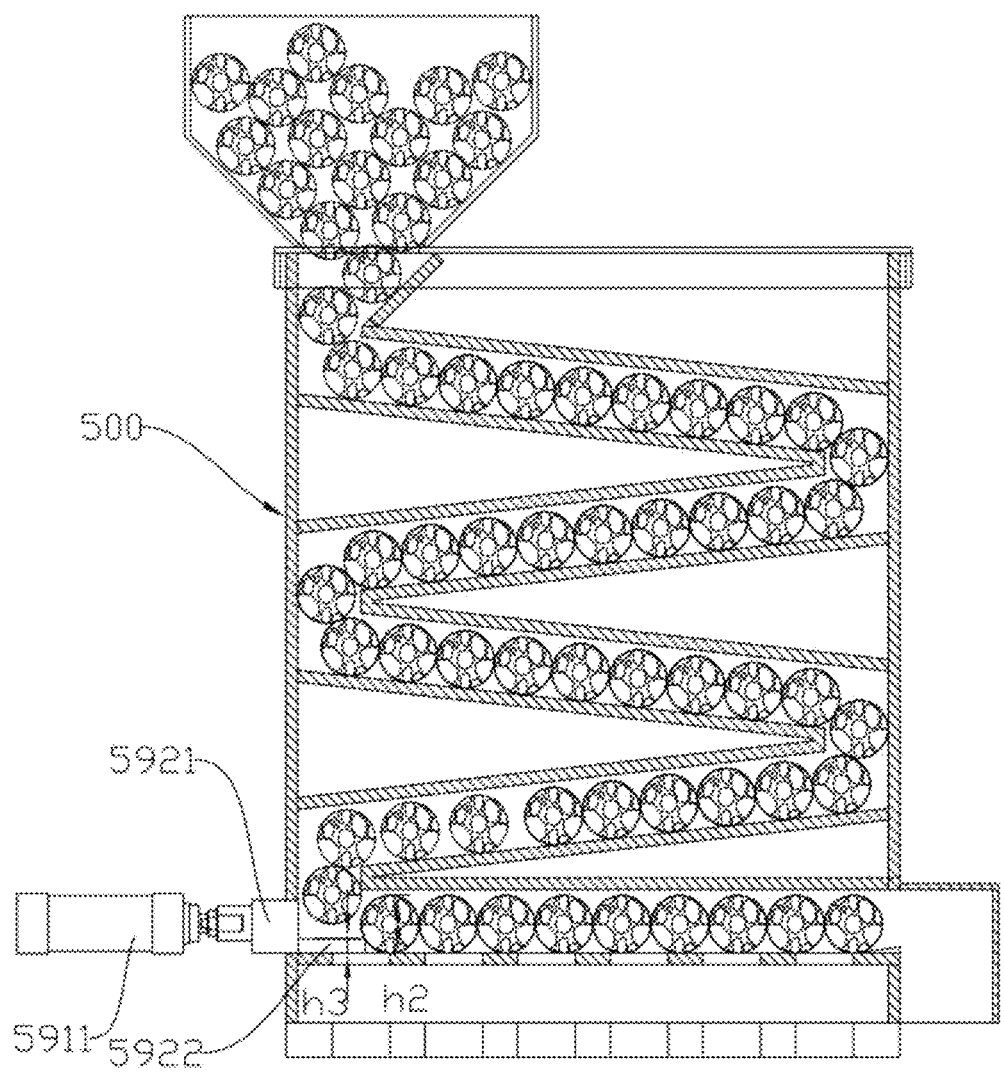
FIG. 24 is a yet still automatic charger in some embodiments of the disclosure.
Figure 25:
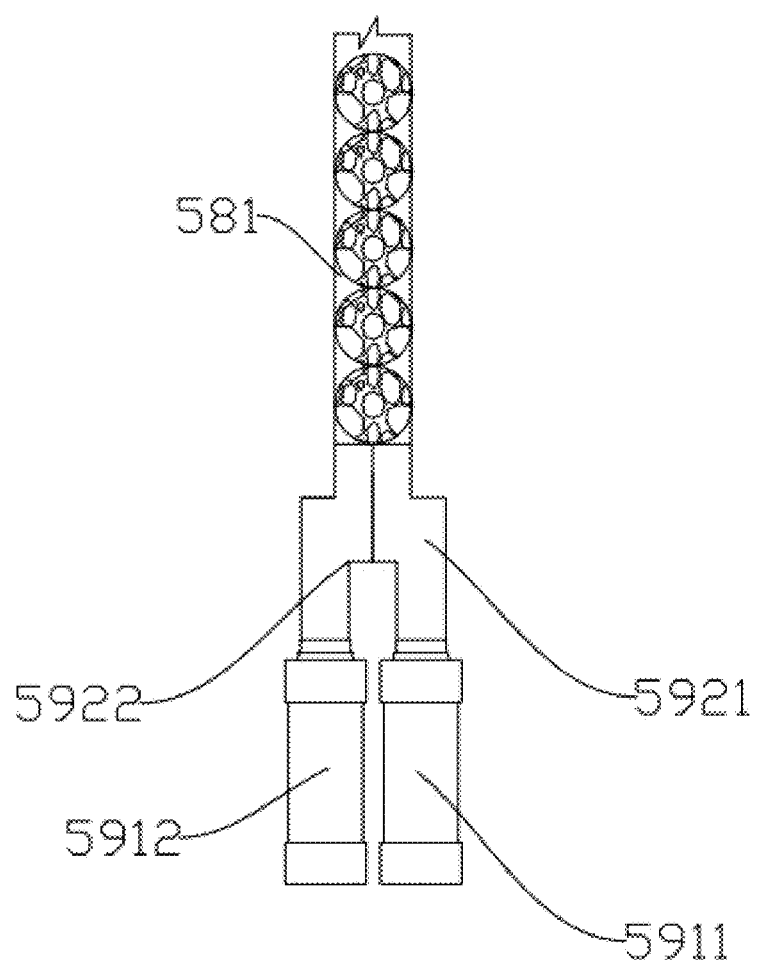
FIG. 25 is a structural schematic diagram of a pushing mechanism in some embodiments of the disclosure.

As illustrated in FIGS. 24 and 25, based on the example embodiments described supra, in another implementation of the disclosure, the pushing mechanism 590 comprises a first drive 5911, a second drive 5912, a first pushing element 5921, and a second pushing element 5922, the first drive 5911 driving the first pushing element 5921 to perform a reciprocating movement in the buffer channel 581, the second drive 5912 driving the second pushing element 5922 to perform a reciprocating movement in the buffer channel 581, the first pushing element 5921 and the second pushing element 5922 being disposed in juxtaposition below the feed port 5813, a height of the second pushing element 5922 being lower than that of the first pushing element 5921, where supposing that the height of the upper end surface of the second pushing element 5922 relative to the bottom surface of the buffer channel 581 is h3, the height of the feedstock in the buffer channel 581 relative to the bottom surface of the buffer channel 581 is h2, 3h3≤h2≤4h3; when pushing the feedstock, the first pushing element 5921 and the second pushing element 5922 simultaneously extend out; after the feedstock in the buffer channel 581 is completely pushed, the first pushing element 5921 is retracted first, such that the feedstock above the buffer channel 581 at least partially enters the buffer channel 581 to access the upper end face of the second pushing element 5922.

In order to prevent occurrence of a circumstance that the rolling-back feedstock blocks falling of the feedstock above the feed port 5813 such that the feedstock above the feed port 5813 cannot fall into the buffer channel 581 and is stuck at the feed port 5813, in this implementation, in a case of a need to charge feedstock, the first pushing element 5921 and the second pushing element 5922 extend out simultaneously, which may push the foremost feedstock in the buffer channel 581 into the feedstock inlet 201, and then the first pushing element 5921 is retracted while the second pushing element 5922 maintains stationary; this may prevent rolling-back of the feedstock in the buffer channel 581 while allowing for the feedstock above the buffer channel 581 to at least partially enter the buffer channel 581 to access the upper end face of the second pushing element 5922; now, the part of feedstock having fallen into the buffer channel 581 may block rolling-back of the feedstock previously disposed in the buffer channel 581; then, the second pushing element 5922 is retracted; since a part of the feedstock on the second pushing element 5922 has been located in the buffer channel 581, it is not easily stuck by the feedstock in the buffer channel 581; therefore, the feedstock on the second pushing element 5922 may continuously move downward under the gravity to access the bottom surface of the buffer channel 581, thereby completing the loading.

Simultaneous extension of the first pushing element 5921 and the second pushing element 5922 may ensure that the feedstock in the buffer channel 581 is pushed into the feedstock inlet 201, while after the first pushing element 5921 and the second pushing element 5922 extend out, it is only needed to limit the feedstock in the buffer channel 581 to prevent its backward-rolling, without a need to provide a power for pushing the feedstock. Therefore, the second pushing element 5922 may be disposed lower in height. In some implementations, $h3 \le h2/3$, namely $3h3 \le h2$. Lower height of the second pushing element 5922 allows for enough feedstock above the buffer channel 581 to fall into the buffer channel 581 after the first pushing element 5921 is retracted, which can block the feedstock falling into the buffer channel 581 from rolling back, and ensures the remaining feedstock to completely fall into the buffer channel 581 after the second pushing element 5922 is retracted. If the second pushing element 5922 is arranged too low, the feedstock in the buffer channel 581 might roll till above the pushing element 592, unable to block backward-rolling of the feedstock; therefore, in order to guarantee the blocking effect, it is needed to provide a certain height for the second pushing element 5922, e.g., $h2/4 \le h3$, i.e., $h2 \le 4h3$.

Figure 26:
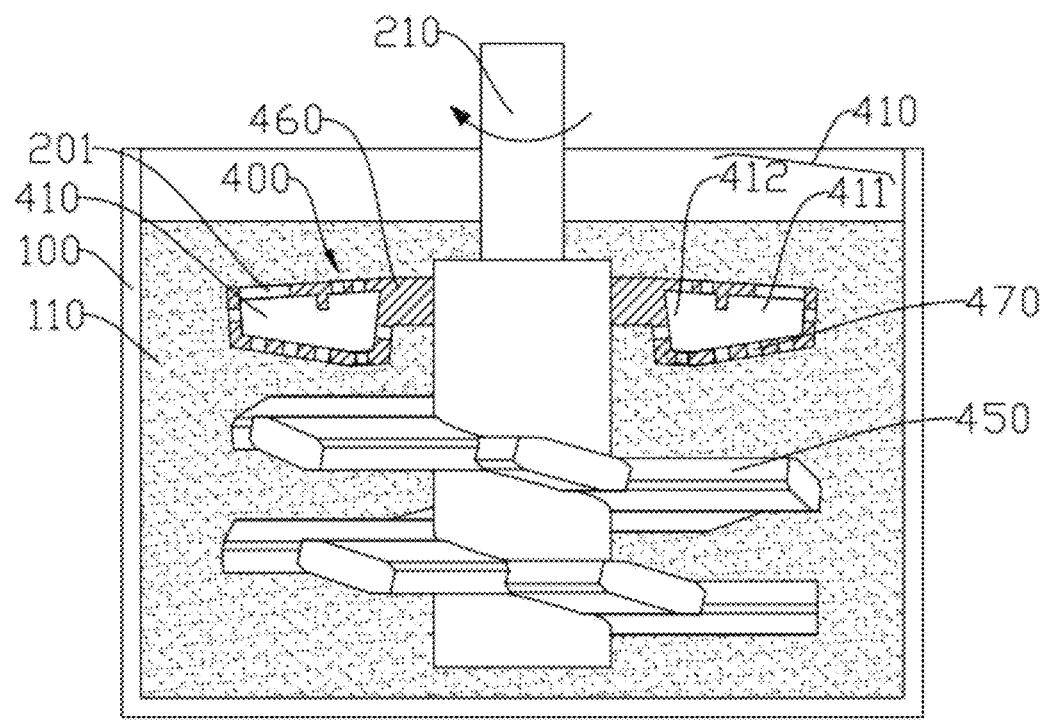
FIG. 26 is a structural schematic diagram of another stirring device in some embodiments of the disclosure.
Figure 27:
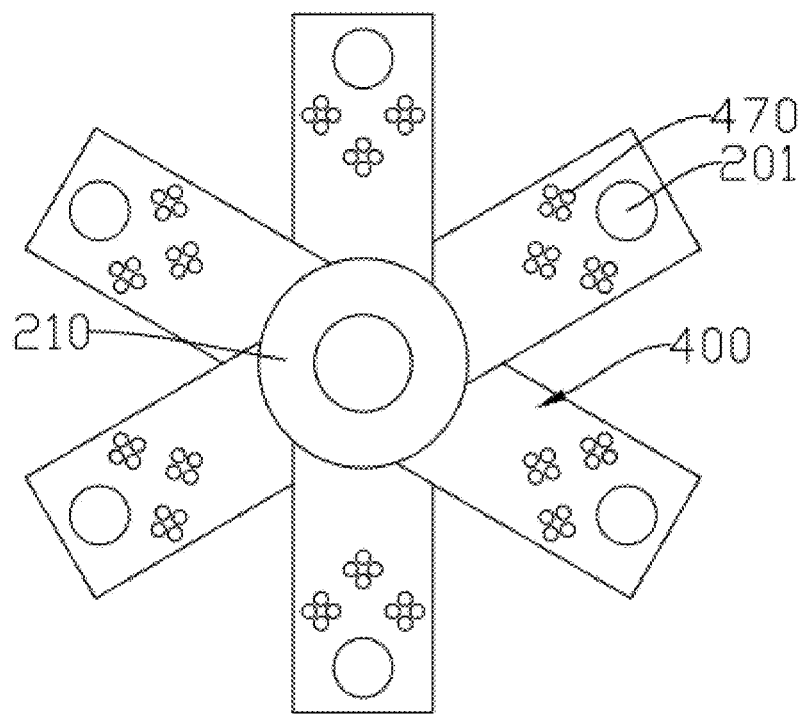
FIG. 27 is a top view of another stirring device in some embodiments of the disclosure.

FIGS. 26 and 27 illustrate another type of metal melting furnace including a stirring device, comprising a furnace body 100 and a stirring device, the furnace body 100 defining a chamber 110 configured to accommodate molten metal, the stirring device comprising a stirring rod 210 and a drive device, a feedstock holding portion 400 and an impeller 450 being provided on the stirring rod 210, the drive device being in drive connection with the stirring rod 210 to drive the stirring rod 210 to rotate and lift, such that the feedstock holding portion 400 and the impeller 450 immersed in the molten metal rotate to stir the molten metal; during the stirring process, the feedstock is held onto the feedstock holding portion 400 such that the feedstock moves along with the feedstock holding portion 400 so as to be melted in the molten metal.

The principle of the drive device in driving the stirring rod to lift and rotate is identical to those described in the implementations noted supra.

During the smelting process, the feedstock charged in the molten metal may be held on the feedstock holding portion 400, such that the feedstock may be immersed into the molten metal along with the feedstock holding portion 400 without floating on top of the molten metal, which prevents the feedstock from being exposed to the air in the high-temperature environment and oxidized to cause abnormal loss of the feedstock; in addition, the oxygen content in the molten metal may also increase; the feedstock does not flow on top of the molten metal or sink to the bottom of the molten metal, without not causing inhomogeneous distribution of the composition of the molten metal. Driven by the drive device, the stirring rod 210 may drive the impeller 450 and the feedstock holding portion 400 to rotate to stir the molten metal, which may improve homogeneity of the feedstock in the molten metal to ensure consistent quality of the metal products; in addition, it eliminates a need for manual stirring, which reduces labor intensity of operators and lowers risks. Moreover, the automatic stirring offers a larger stirring range than manual stirring, preventing quality defects due to insufficient stirring of some areas in the molten metal; in addition, its stirring efficiency is also higher than the manual operation with reduced stirring duration.

In one implementation, the feedstock holding portion 400 comprises a housing 460, a cavity 410 defined by the housing 460, and a through hole 470 which is provided on the housing 460 and communicates with the cavity 410, the through hole 470 having a size smaller than that of the feedstock. The feedstock is accommodated in the cavity 410; during the stirring process, the molten metal may access the cavity 410 via the through hole 470 so as be sufficiently mixed with the feedstock; then, the molten metal mixed with the feedstock composition flows out of the cavity 410 via the through hole 470 so as to be mixed with the external molten metal; in this way, the feedstock is homogeneously distributed in the molten metal. Since the size of the through hole 470 is smaller than that of the feedstock, the feedstock can be kept in the cavity 410. As the feedstock is melted, its size will be shrunk to be smaller than that of the through hole 470, such that the feedstock likely exits the feedstock holding portion 400 via the through hole 470; however, since the feedstock size has been significantly shrunk, even if it floats on top of the molten metal or sinks to the bottom of the molten metal, there would have little impact on the composition of the molten metal; and if the molten metal has a high melting point, the feedstock would be completely melted before floating on top of the molten metal or sinking to bottom of the molten metal.

A plurality of feedstock holding portions 400 and a plurality of impellers 450 are arranged at intervals along a circumferential direction of the stirring rod 210. The plurality of feedstock holding portions 400 allow for more feedstock to be charged into the molten metal at one time, and the plurality of impellers 450 allow for enhancing molten metal stirring efficiency and improving homogeneity of feedstock distribution in the molten metal.

The cavity 410 comprises an inlet zone 411 and a melting zone 412, an inlet hole 201 commutating with the cavity 410 to feed feedstock to the inlet, zone 4110 being further provided on the housing 460, a feedstock guide portion for guiding the feedstock from the inlet zone 411 to the melting zone 412 being provided at a bottom wall of the cavity 410, the feedstock guide portion being of a bevel structure. The feedstock inlet 201 communicates with the cavity 410 so as to replenish the feedstock to the feedstock holding portion 400 after the feedstock is used up, the feedstock entering the inlet zone 411 via the feedstock inlet 201; the feedstock charged in the cavity 410 via the feedstock inlet 201 may move to the melting zone 412 from the inlet zone 411 along the feedstock guide portion under its own gravity, thereby reducing the odds of the feedstock exiting the feedstock holding portion 400 via the feedstock inlet 201.

In a rotating direction of the stirring rod 210 (in FIG. 26, the arrow in the stilling rod 210 denotes the rotating direction of the stirring rod 210), the front end of the impeller 450 is higher than the rear end so as to guide the molten metal to flow from top to bottom during the rotating process; in this way, the molten metal in the bottom layer will not be brought to move upward, without causing diffusion of the impurities in the bottom layer of the molten metal and deteriorating product quality. The stirring rod 210 can bring the impeller 450 to rotate slowly, such that the molten metal flows gently without causing upward surge of the bottom-layer molten metal.

In some implementations, the feedstock holding portion 400 is disposed above the impeller 450, which can facilitate replenishment of the feedstock to the feedstock holding portion 400; the molten feedstock is distributed in the top-layer molten metal, such that during the process of stirring the molten metal, the impeller 450 can guide the top-layer molten metal including extensive feedstock composition to move downward, thereby homogenizing feedstock distribution.

Of course, the feedstock holding portion may also be disposed below the impeller, such that under the action of the impeller, the flow rate of the molten metal passing through the feedstock holding portion may increase, which facilitates diffusion of the feedstock.

Alternatively, the feedstock holding portion may be disposed between two layers of impellers, where the upper-layer impeller may increase the flow rate of the molten metal passing through the feedstock holding portion, and the lower-layer impeller allows for the molten metal including feedstock composition to flow and diffuse downward.

What have been described supra are only specific implementations of the disclosure; however, the scope of protection of the disclosure is not limited thereto. Those skilled in the art shall appreciate that the disclosure includes, but is not limited to, the contents described in the drawings and the specific implementations. Any modification without departing from the functions and structural principles of the disclosure will be included in the scope of the appended claims.

We claim:

1. A metal melt furnace including a stirring device, comprising: a furnace body defining a chamber for accommodating molten metal; the stirring device comprising a stirring rod and a drive device, a feedstock holding portion and an impeller being provided outwardly along a radial direction on an outer sidewall of the stirring rod, the drive device being in drive connection to the stirring rod so as to drive the stirring rod to rotate and lift such that the feedstock holding portion and the impeller, when being immersed in the molten metal, rotate to stir the molten metal, feedstock being held on the feedstock holding portion such that the feedstock moves along with the feedstock holding portion, wherein in a rotating direction of the stirring rod, a front end of the impeller is higher than a rear end of the impeller so as to guide the molten metal to flow from top to bottom during rotating of the impeller, and wherein the impeller is disposed below the feedstock holding portion so as to guide the molten metal carrying feedstock composition to move downward during stirring.

2. The metal melt furnace including a stirring device according to claim 1, wherein the feedstock holding portion comprises a housing, a cavity defined by the housing, and a through hole which is provided on the housing and communicates with the cavity, the through hole having a size smaller than a size of the feedstock.

3. The metal melt furnace including a stirring device according to claim 2, wherein the cavity comprises an inlet zone and a melting zone; a feedstock inlet communicating with the cavity so as to charge the feedstock to the inlet zone is further provided on the housing; a feedstock guide portion for guiding the feedstock from the inlet zone to the melting zone is provided at a bottom wall of the cavity.

* * * * *